US008068968B2

(12) United States Patent
Kondoh

(10) Patent No.: US 8,068,968 B2
(45) Date of Patent: Nov. 29, 2011

(54) VEHICLE TRAVEL CONTROL SYSTEM

(75) Inventor: Toshiyuki Kondoh, Kariya (JP)

(73) Assignee: Denso Corporation, Kariya (JP)

( * ) Notice: Subject to any disclaimer, the term of this patent is extended or adjusted under 35 U.S.C. 154(b) by 969 days.

(21) Appl. No.: 12/012,981

(22) Filed: Feb. 4, 2008

(65) Prior Publication Data

US 2008/0185207 A1    Aug. 7, 2008

(30) Foreign Application Priority Data

Feb. 6, 2007   (JP) .................................. 2007-027186
Nov. 27, 2007  (JP) .................................. 2007-306452

(51) Int. Cl.
G08B 23/00 (2006.01)
B60W 30/14 (2006.01)

(52) U.S. Cl. ................. 701/96; 701/72; 701/93; 701/97; 180/272; 340/439; 340/576

(58) Field of Classification Search ..................... 701/91, 701/92, 97
See application file for complete search history.

(56) References Cited

U.S. PATENT DOCUMENTS

| 5,485,892 | A | 1/1996 | Fujita |
| 5,969,969 | A | 10/1999 | Ejiri et al. |
| 6,974,414 | B2 * | 12/2005 | Victor ........................... 600/300 |
| 7,460,940 | B2 * | 12/2008 | Larsson et al. ................. 701/49 |
| 7,639,148 | B2 * | 12/2009 | Victor ........................... 340/576 |
| 7,705,738 | B2 * | 4/2010 | Fukaya et al. ................. 340/576 |
| 7,777,619 | B2 * | 8/2010 | Yopp et al. ..................... 340/439 |
| 7,821,384 | B2 | 10/2010 | Kocher |
| 2004/0040765 | A1 | 3/2004 | Satou et al. |
| 2005/0030184 | A1 * | 2/2005 | Victor ........................... 340/576 |
| 2005/0073136 | A1 * | 4/2005 | Larsson et al. ................. 280/735 |
| 2007/0182529 | A1 | 8/2007 | Dobler et al. |

FOREIGN PATENT DOCUMENTS

| DE | 197 34 307 | 2/1999 |
| JP | 5-094600 | 4/1993 |
| JP | 5-113822 | 5/1993 |
| JP | 5-325098 | 12/1993 |
| JP | 8-268287 | 10/1996 |
| JP | 11-314534 | 11/1999 |
| JP | 2000-211543 | 8/2000 |
| JP | 2001-071833 | 3/2001 |
| JP | 2002-127780 | 5/2002 |

(Continued)

OTHER PUBLICATIONS

Office action dated Dec. 24, 2008 in Japanese application No. 2007-306452.

(Continued)

*Primary Examiner* — Thomas Black
*Assistant Examiner* — Lin B Olsen
(74) *Attorney, Agent, or Firm* — Harness, Dickey & Pierce, PLC

(57) ABSTRACT

A vehicle travel control system includes a cruise control ECU, an engine control ECU and a brake control ECU. The cruise control ECU checks whether a driver's actual concentration degree is insufficient relative to a required concentration degree in terms of safety in surrounding environments of the subject vehicle. When such possibility arises, even during the cruise control, the speed of the subject vehicle is controlled to match a control vehicle speed lower than a set vehicle speed or a control distance to a preceding vehicle.

22 Claims, 13 Drawing Sheets

FOREIGN PATENT DOCUMENTS

| | | |
|---|---|---|
| JP | 2002-144912 | 5/2002 |
| JP | 2003-272100 | 9/2003 |
| JP | 2004-090712 | 3/2004 |
| JP | 2004-178367 | 6/2004 |
| JP | 2004-276641 | 10/2004 |
| JP | 2005-092285 | 4/2005 |
| JP | 2007-001402 | 1/2007 |
| JP | 2007-512989 | 5/2007 |
| JP | 2007-265377 | 10/2007 |
| JP | 2007-528815 | 10/2007 |
| WO | WO 2005/044612 | 5/2005 |

OTHER PUBLICATIONS

Office action dated Feb. 21, 2011 in corresponding German Application No. 10 2008 007555.8.

* cited by examiner

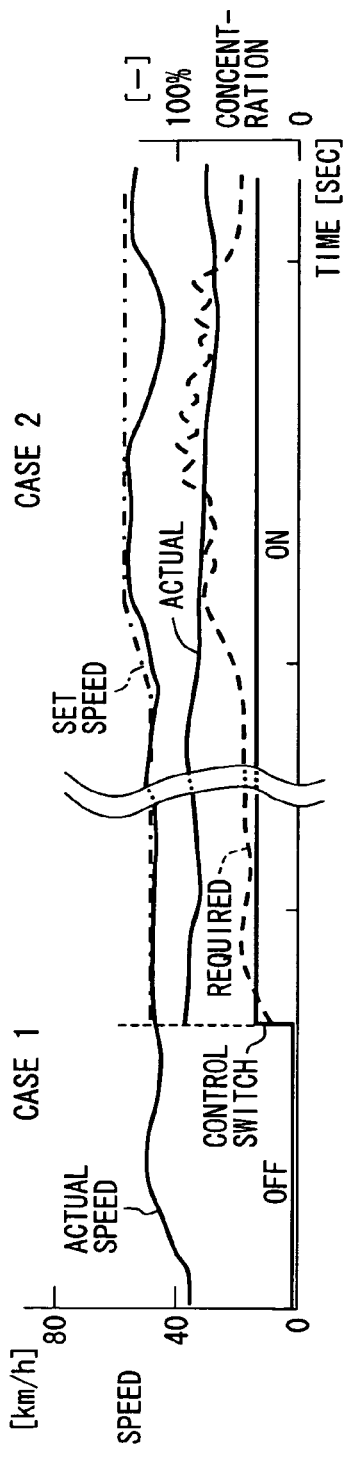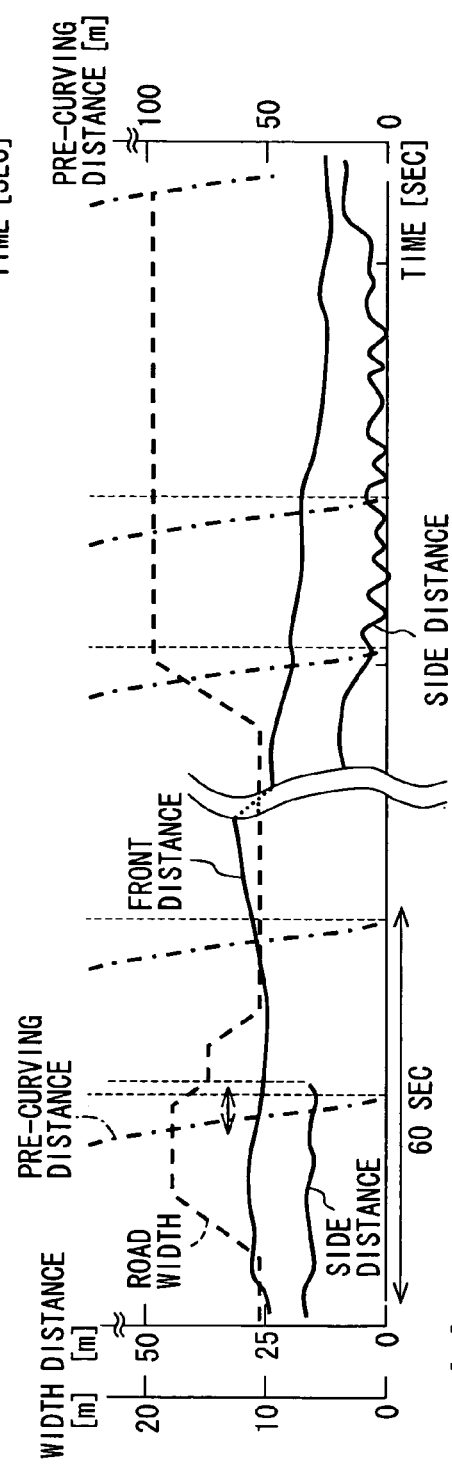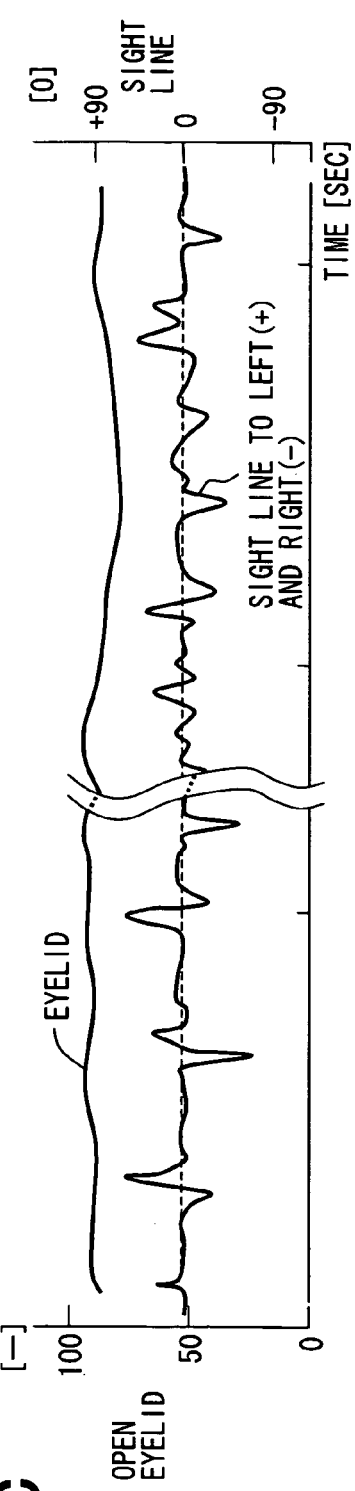
FIG. 13A
FIG. 13B
FIG. 13C

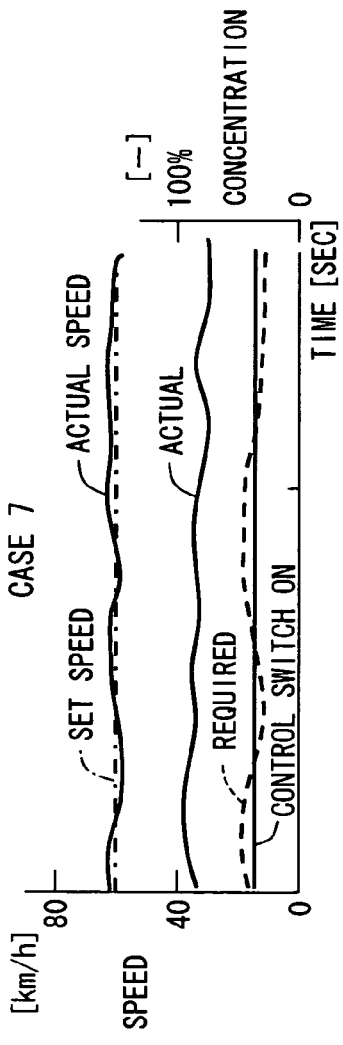
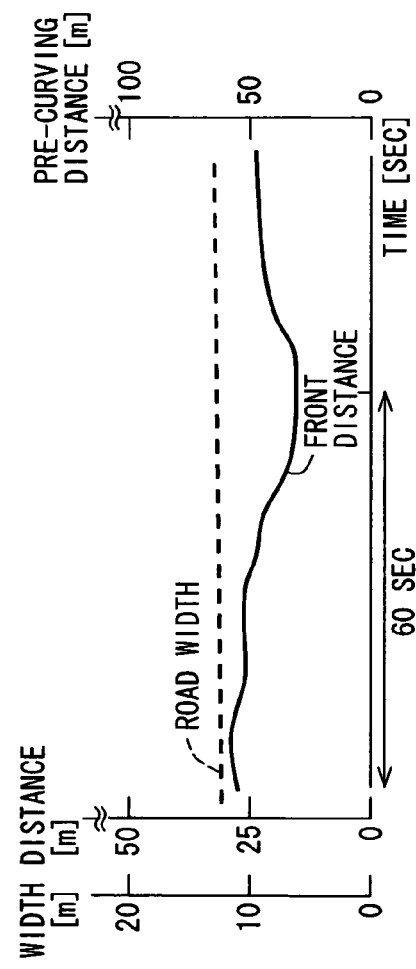
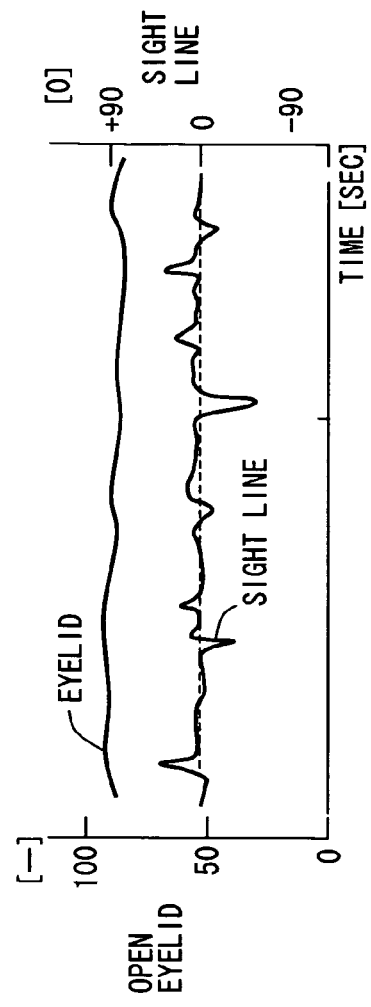
FIG. 16A
FIG. 16B
FIG. 16C

VEHICLE TRAVEL CONTROL SYSTEM

CROSS REFERENCE TO RELATED APPLICATION

This patent application relates to and incorporates herein Japanese Patent Applications No. 2007-27186 filed on Feb. 6, 2007 and No. 2007-306452 filed on Nov. 27, 2007.

FIELD OF THE INVENTION

The present invention relates to a vehicle travel control system that can enhance safety during cruise control operation of a vehicle by a device performing the cruise control, wherein the cruise control allows automatic cruise of the vehicle without requiring operations on an accelerator pedal and a brake pedal by a driver.

BACKGROUND OF THE INVENTION

As devices performing cruise control of a vehicle, auto-cruise control and adaptive cruise control are disclosed in e.g., US 2004/0040765 (JP 2004-90712A) and U.S. Pat. No. 5,969,969 (JP 2003-272100A), respectively. The auto-cruise control allows a vehicle to travel at a driver-set vehicle speed, and the adaptive cruise control allows a vehicle to travel to follow a preceding vehicle while keeping a specific vehicular distance. Since a vehicle equipped with such cruise controllers eliminates the need for a driver to perform accelerator pedal and brake pedal operations, or reduces the number of the operations, the load of driving operations on the driver can be reduced.

Driving support control is also disclosed in JP 2000-211543A. This control does not perform the above cruise control but reduces the load of a steering operation, which is one of vehicle driving operations. This driving support control determines the degree of concentration of a driver on driving operations, and strengthens or relaxes the support of steering operation according to the concentration degree. That is, when the degree of concentration of the driver on driving operations is high, the need to support driving is little and support driving rather gives the driver a sense of incongruity, steering auxiliary force applied to a steering device of the vehicle to support driving is decreased. Conversely, when a concentration degree is low, steering auxiliary force is increased.

When a vehicle includes the above cruise control, although the load of a driver on driving operations can be reduced, the driver has overconfidence in the vehicle of being capable of driving even without performing operations by himself, so that attention to surrounding environments may be decreased. Particularly, when the cruise control last long, driver's attention may be distracted or lowered.

However, for example, when another vehicle traveling slower than the subject vehicle (own vehicle) changes laterally from an adjacent lane to the lane of the subject vehicle during the cruising at a fixed vehicle speed by cruise control, the driver must intervene in operations as required. Thus, during the cruise control, the driver must intervene in operations according to a change in surrounding environments. At this time, when the driver is low in concentration, a delay in recognition, judgment, and operations, and reduction in correctness may occur.

The above driving support control described in JP A-2000-211543 increases driving support in steering operations when the degree of concentration of the driver on driving operations is low. Therefore, even if the degree of concentration of the driver on driving operations is low, the vehicle can be controlled to travel a desired path. However, when a situation change that requires operation intervention by the driver occurs, again, a delay in recognition, judgment, and operations, and reduction in correctness may occur.

SUMMARY OF THE INVENTION

It is therefore an object of the present invention to provide a vehicle travel control system that can remarkably increase safety during the cruise control.

According to the present invention, a vehicle travel control system automatically drives a subject vehicle without a driver's cruise operation for adjusting a cruise speed of the subject vehicle. In the travel control, a driver's actual concentration degree is detected based on a state of the driver, and a control content is changed based on the detected actual concentration degree of the driver.

Preferably, a required concentration degree required to the driver for safely cruising the subject vehicle is determined based on surrounding environments of the subject vehicle. The control content is changed based on a relationship between the required concentration degree and the actual concentration degree.

BRIEF DESCRIPTION OF THE DRAWINGS

The above and other objects, features and advantages of the present invention will become more apparent from the following detailed description made with reference tot the accompanying drawings. In the drawing:

FIGS. 13A to 13C show examples of control in a situation (case 1) in which auto-cruise control is started by a driver, and a situation (case 2) in which a vehicular distance from an adjacent vehicle traveling on an adjacent lane has become short during auto-cruise control;

FIGS. 16A to 16C show a state in which the driver keeps a high concentration degree during auto-cruise control;

DETAILED DESCRIPTION OF THE PREFERRED EMBODIMENTS

First Embodiment

Figure 1:
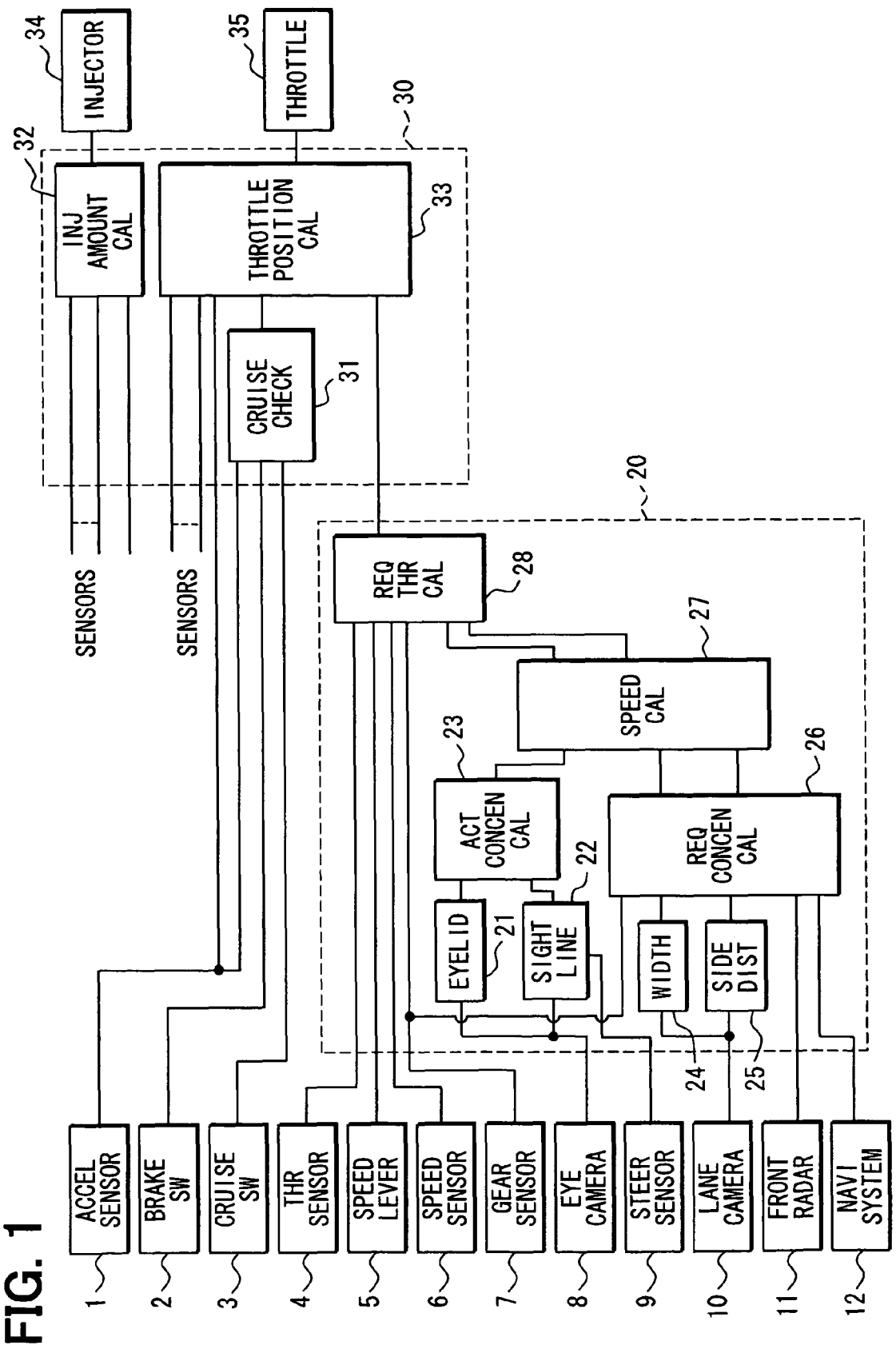
FIG. 1 is a block diagram showing a vehicle travel control system of a first embodiment of the present invention.

As shown in FIG. 1, a vehicle travel control system mounted on a subject vehicle includes various sensors and switches, an auto-cruise (electronic control unit) ECU 20, and an engine control ECU 30. With respect to the auto-cruise ECU 20 and the engine control ECU 30, functions performed by the ECUs 20 and 30 are shown as functional blocks.

The engine control ECU 30 receives signals from an accelerator position sensor 1, a brake switch 2, and a cruise control actuation switch 3, in addition to signals from various sensors. The accelerator position sensor 1 outputs a detection signal corresponding to the depression amount of an accelerator pedal (not shown) by the driver of its subject vehicle (subject vehicle). The brake switch 2, when a brake pedal (not shown) is depressed by the driver, outputs a brake operation signal. The cruise control actuation switch 3 outputs a signal indicating the start or end of the cruise control function. The cruise control actuation switch 3 outputs a signal for starting cruise control when a set switch in a vehicle speed setting lever 5 described later is operated.

The engine control ECU 30 includes a cruise control actuation check unit 31, which checks whether cruise control is in progress, based on signals from the above accelerator position sensor 1, brake switch 2, and cruise control actuation switch 3, and according to the determination result, outputs a cruise control actuation signal or non-actuation signal.

Specifically, when a signal (ON signal) for starting cruise control (turning on signal) is inputted from the cruise control actuation switch 3, until an end signal (OFF signal) is inputted, the engine control ECU 30 determines that cruise control is in progress, and outputs a cruise control actuation signal. However, even when cruise control is in progress, for example, when the driver steps an accelerator pedal to overtake a preceding vehicle, the accelerator pedal operation by the driver should take precedence. Therefore, when acceleration operation by the driver is detected, the cruise control actuation check unit 31 determines that the cruise control has been temporarily stopped. In this case, upon the termination of the accelerator pedal operation by the driver, the cruise control is restarted. When the brake pedal is operated during the cruise control, the cruise control actuation check unit 31 determines that the termination of cruise control is commanded, and outputs a cruise control non-actuation signal.

A signal from the cruise control actuation check unit 31 is fed to a throttle position calculation unit 33. The throttle position calculation unit 33 calculates a command opening (angular position) of a throttle valve provided in an engine intake pipe, and outputs it to an electronic throttle device 35. The electronic throttle device 35 includes a motor for rotationally driving the throttle valve, and drives the throttle valve by the motor to get to the command opening calculated in the throttle position calculation unit 33. As the electronic throttle device 35, any of mechanical link type with the accelerator pedal and the throttle valve connected by link, and link-less type that no connection is made by link may be used.

The throttle position calculation unit 33, when a cruise control actuation signal is outputted from the cruise control actuation check unit 31, calculates a command opening of the throttle valve, based on a required throttle position outputted from the auto-cruise ECU 20. On the other hand, when a cruise control non-actuation signal is outputted from the cruise control actuation check unit 31, the throttle position calculation unit 33 calculates a command opening of the throttle valve, based on an operating state of an engine including the accelerator position sensor 1, and signals from various sensors for detecting a cruise state of the vehicle.

The engine control ECU 30 includes an injection amount calculation unit 32 and the like. The injection amount calculation unit 32 calculates a fuel injection amount supplied to the engine, based on signals from various sensors that detect operating states of the engine, and based on the fuel injection amount, outputs a drive signal to injectors 34 that inject fuel to the intake pipe and cylinders.

The auto-cruise ECU 20 calculates a throttle position necessary for the vehicle to travel at a fixed speed at a vehicle speed set by the user, and outputs it to the engine control ECU 30 as a requested throttle opening. However, although detailed later, when the auto-cruise ECU 20 determines that the cruise of the vehicle at the set vehicle speed cannot assure sufficient safety of the vehicle, based on an actual concentration degree of the driver detected from the state of the driver of its subject vehicle, and a required concentration degree required for the driver to drive safely the subject vehicle in surrounding environments of its subject vehicle, the auto-cruise ECU 20 calculates a control vehicle speed lower than the set vehicle speed. The auto-cruise ECU 20 executes a throttle position degree for driving the vehicle at the control vehicle speed and outputs it to the engine control ECU 30.

To execute the above-described control processing in the auto-cruise ECU 20, the auto-cruise ECU 20 receives signals from a throttle position degree sensor 4, a vehicle speed setting lever 5, a vehicle speed sensor 6, a gear position sensor 7, an eye condition (visual state) detection camera 8, a steering sensor 9, a lane information recognition camera 10, a front recognition radar 11, and a navigation system 12.

The throttle position degree sensor 4 outputs a detection signal indicating an opening degree of the throttle valve. The vehicle speed sensor 6 is mounted in a shaft and the like of the subject vehicle, and outputs a detection signal indicating the cruise speed of the subject vehicle. The gear position sensor 7 outputs a detection signal indicating a gear position in the transmission of the subject vehicle.

The vehicle speed setting lever 5 determines a set vehicle speed in cruise control. The vehicle speed setting lever 5, for example, includes: a set switch that sets cruise speed of subject vehicle when operated, as a set vehicle speed; an accelerator switch that accelerates a set vehicle speed; a coast switch that decelerates a set vehicle speed; and a resume switch that commands resuming cruise control at a previous set vehicle speed after cruise control is released. By operating these switches, the driver of its subject vehicle can execute cruise control by setting a desired set vehicle speed.

The eye condition detection camera 8, disposed within a vehicle compartment, to detect eye conditions such as driver's eyes and opening degree of the eyelid, outputs a photographing signal that photographs driver's face. The steering sensor 9 outputs a detection signal indicating a steering angle of a steering wheel of the subject vehicle. The lane information recognition camera 10 outputs a photographing signal that photographs the front of a traveling direction of the subject vehicle. The lane information recognition camera 10 is disposed within the vehicle compartment of the subject vehicle to cover white lines for partitioning cruise lanes on which the subject vehicle is traveling, and other vehicles traveling on the lane of the subject vehicle and adjacent lanes as a photographing range.

The front recognition radar 11 is, for example, a laser radar of scan type, and is provided in the front bumper part of the subject vehicle or in its vicinity. The front recognition radar 11 emits a laser beam forward of the subject vehicle over a specific angle range of a traveling direction to detect other vehicles existing in a specific range (scan range) forward of the subject vehicle from the reflected light. As the front recognition radar 11, a millimeter wave radar and the like that use millimeter waves may be adopted.

The navigation system 12 includes a detector for a present position of the subject vehicle such as a GPS receiver, and a storage medium (hard disk and the like) that stores road map data. When the navigation system 12 determines that the front of the road on which the subject vehicle is traveling is curved, based on a present position of the subject vehicle and road map data, it calculates a distance from the curve point and outputs it to the auto-cruise ECU 20.

The auto-cruise ECU 20 includes an actual concentration calculation unit 23. The actual concentration calculation unit 23 calculates a driver's actual concentration degree, based on driver's eye condition. Hereinafter, a method for detecting a driver's actual concentration degree will be detailed.

The actual concentration calculation unit 23 receives a signal from an eyelid opening detection unit 21 that detects a driver's eyelid opening degree, and a signal from an eye sight line detection unit 22 that detects the direction (sight line) of driver's eyes. The eyelid opening detection unit 21 performs image recognition processing for photographing signals of the eye condition detection camera 8 to output an eyelid opening signal indicating the position of a present eyelid relative to the position in which the eyelid is most opened. The sight line detection unit 22 determines a traveling direction of the vehicle, based on a detection signal of the steering sensor 9, and at the same time performs image recognition processing for photographing signals of the eye condition detection camera 8, thereby calculating a deviation angle of driver's eye direction (sight line) with respect to the traveling direction of the vehicle, and outputting an eye direction signal indicating the deviation angle. The actual concentration calculation unit 23 calculates a driver's actual concentration degree according to a relationship shown in graphs of FIGS. 2 to 5, based on the eyelid opening degree signal and the eye direction signal.

Figure 2:
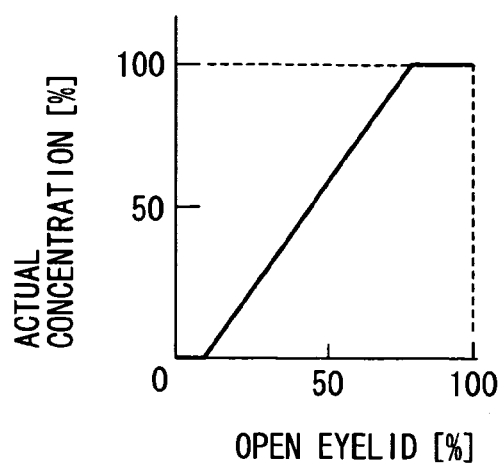
FIG. 2 is a graph showing a relationship between driver's eyelid opening degrees and actual concentration degrees.

A first actual concentration degree in percentage relative to the driver's eyelid opening degree (open eyelid in percentage) is shown in FIG. 2. According to the relation of FIG. 2, the first actual concentration degree is determined to be almost proportional to eyelid opening degree. This means that the driver feels sleepy or decreases in attention when an eyelid opening degree is low during the driving of the vehicle. Conversely, when an eyelid opening degree is high, it is conceivable that the driver has strong consciousness and is driving with high concentration.

Figure 3:
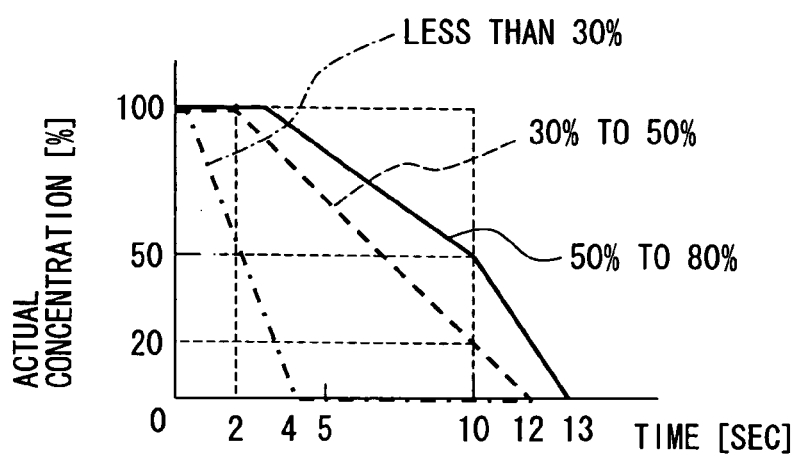
FIG. 3 is a graph showing a relationship between driver's eyelid opening degrees as well as its duration and actual concentration degrees.

A second actual concentration degree relative to not only eyelid opening degree but also its duration is shown in FIG. 3. According to the relation of FIG. 3, the second actual concentration degree is determined based on the eyelid opening degree and its time duration in second. Thus, by taking an eyelid opening degree as well as its duration into account, a reduction in driver's actual concentration degree can be more accurately detected.

As shown in FIG. 3, when driver's eyelid opening degree is lower than a specific opening degree (80%), states of eyelid opening degree are divided into three regions (less than 30%, between 30% and 50%, and between 50% and 80%) so that lower degree of actual concentration is calculated in shorter duration in regions in which eyelid opening degree is lower. This is done to indicate that lower eyelid opening degree indicates lower degree of driver's concentration on vehicle driving regardless of short duration.

Figure 4:
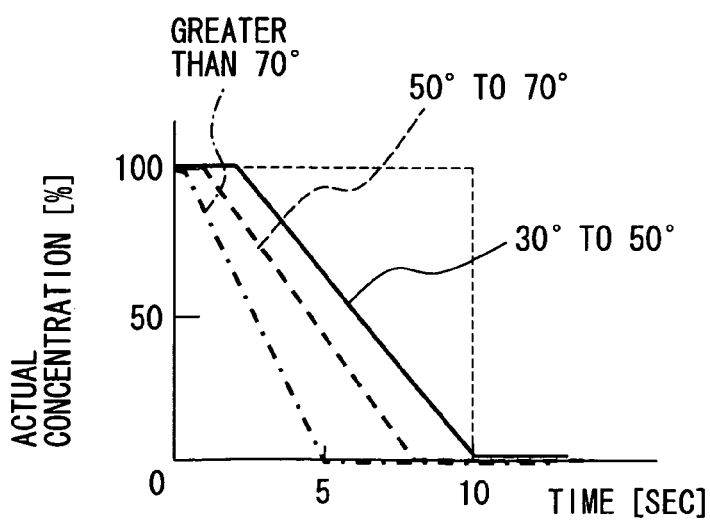
FIG. 4 is a graph showing a relationship between driver's eye direction and duration, and actual concentration degrees when driver's eye direction is a specific angle or more off the traveling direction of a vehicle.
Figure 5:
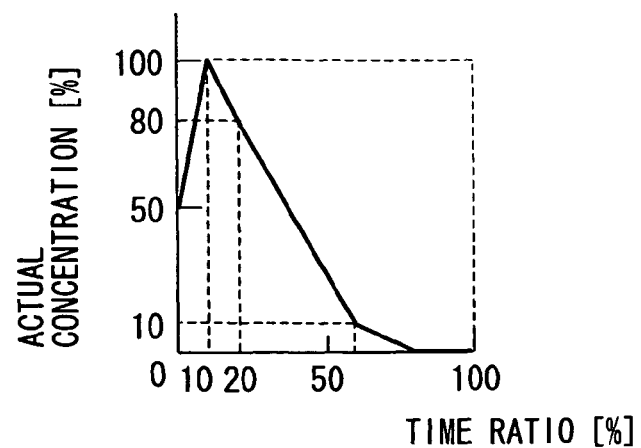
FIG. 5 is a graph showing a relationship between time ratios that the angle absolute values of driver's eye direction are a specific angle or more off the traveling direction of the vehicle in a specific time interval, and actual concentration degrees.

A third actual concentration relative to driver's eye direction (sight line angle) in degrees from the traveling direction of the vehicle and time duration is shown in FIG. 4. When the driver's eye direction remains a specific angle or more off the traveling direction of the vehicle, it can be determined that driver's attention is paid to anything other than driving operation, and the driver concentrates less on driving. When the driver's eye direction matches the traveling direction of the vehicle, the angle of eye direction becomes zero, and when driver's eye direction deviates left or right with respect to the traveling direction of the vehicle, its deviation angle is regarded as the angle absolute value of the eye direction.

According to the relation of FIG. 4, when the angle absolute value of driver's eye direction is equal to or greater than a specific angle (30 degrees), the angle absolute value of the eye direction is divided into three regions (30 degrees or more, between 30 degrees and 50 degrees, between 50 degrees and 70 degrees, and 70 degrees or more) so that lower degree of actual concentration is determined in shorter duration in regions in which the angle absolute values of eye direction are larger. This is done to indicate that larger angle absolute values of eye direction indicate lower degrees of driver's concentration on vehicle driving regardless of short duration.

A fourth actual concentration relative to a time ratio in which the angle absolute value of driver's eye direction is a specific angle (30 degrees) or more off the traveling direction of the vehicle in a specific time interval (e.g., 10 seconds). According to the relation of FIG. 5, the fourth actual concentration degree is determined based on a time ratio that the angle absolute values of driver's eye direction are a specific angle or more.

When concentrating on driving in a certain time interval, since the driver pays attention to not only forward of its subject vehicle but also the lateral or sidewise direction, usually, the angle absolute values of driver's eye direction often exceed the above specific angle. That is, when the driver always directs the eyes to a narrow angle range forward of the vehicle, or the driver frequently directs the eyes in the lateral direction of the vehicle beyond the specific angle, driver's concentration on driving is considered to be relatively decreasing. Therefore, in the relation of FIG. 5, the highest degree of actual concentration is determined when the time ratio that the angle absolute values of driver's eye direction exceeds a specific angle is about 10%, and lower degrees of actual concentration are determined as the time ratio becomes more distant from 10%.

The actual concentration calculation unit 23 determines the first to fourth actual concentration degrees according to the graphs shown in FIG. 2 to FIG. 5, and uses them in determining a final actual concentration degree. In this embodiment, a minimum value of the first to fourth actual concentration degrees is selected as the final actual concentration degree. This prevents a driver's actual concentration degree from being calculated to be higher than an actual concentration degree. However, to consider plural actual concentration degrees, besides selecting a minimum value, for example, an average value may be found, or the sum of plural actual concentration degrees may be found.

The auto-cruise ECU 20 further includes a required concentration calculation unit 26. The required concentration calculation unit 26 calculates a required concentration degree required from the driver for safe cruise of its subject vehicle in surrounding environments of its subject vehicle. The following details a method for calculating the required concentration degree.

The required concentration calculation unit 26 receives a vehicle speed of the subject vehicle detected by the vehicle speed sensor 6, the width of a road on which the subject vehicle travels detected by a road width detection unit 24, a vehicular distance from an adjacent vehicle traveling on an adjacent lane detected by a vehicular distance detection unit 25, a distance from a curve road starting point outputted from the navigation system 12, and a vehicular distance from a preceding vehicle traveling on the lane of the subject vehicle detected by the front recognition radar 11.

The road width detection unit 24 detects and outputs the width of a road on which the subject vehicle is traveling, by performing image recognition processing for photographing signals of a lane information recognition camera. The road width detection unit 24, when a sidewalk is provided in addition to the roadway, detects the length of a lateral direction including the sidewalk as a road width. For road widths, when the width of each road is stored in road map data of the navigation system 12, data on road widths may be acquired from the navigation system 12.

The vehicular distance detection unit 25 recognizes the adjacent vehicle traveling on the adjacent lane by performing image recognition processing for photographing signals of a lane information recognition camera, along with calculating the distance between the subject vehicle and the adjacent vehicle, based on the position of the adjacent vehicle by the photographing signals.

A vehicular distance from the adjacent vehicle can be calculated based on a detection result of the front recognition radar 11. That is, since an adjacent vehicle traveling on an adjacent lane is detected in a position shifted by lane width in the lateral direction with respect to the traveling direction of the subject vehicle, when the front recognition radar 11 detects another vehicle, the driver can determine whether the vehicle is a preceding vehicle traveling on the same lane as the subject vehicle or an adjacent vehicle traveling on the adjacent lane, from the detection position in the lateral direction, and can detect a vehicular distance from the adjacent vehicle. However, when the road on which the subject vehicle is traveling is curved in front, it is difficult to distinguish between the preceding vehicle and the adjacent vehicle from the detection position in the lateral direction. Therefore, it is preferable to detect that the subject vehicle is traveling in curve, based on a detection signal of a steering sensor and a yaw rate sensor, and obtain data concerning road shapes forward of the subject vehicle from the navigation system 12. With this, regardless of road shapes, a vehicular distance from a preceding vehicle and a vehicular distance from an adjacent vehicle can be determined based on a detection result of the front recognition radar 11.

Although, in this embodiment, a vehicular distance from a preceding vehicle is detected by the front recognition radar 11, by a photographing signal of the lane information recognition camera 10, a vehicular distance from a preceding vehicle can be found, besides a vehicular distance from an adjacent vehicle.

The required concentration calculation unit 26 calculates the required concentration degrees respectively according to the relationships shown by the graphs of FIGS. 6 to 10, based on vehicle speed, road width, vehicular distances from a preceding vehicle and an adjacent vehicle, and a distance from a curved road.

Figure 6:
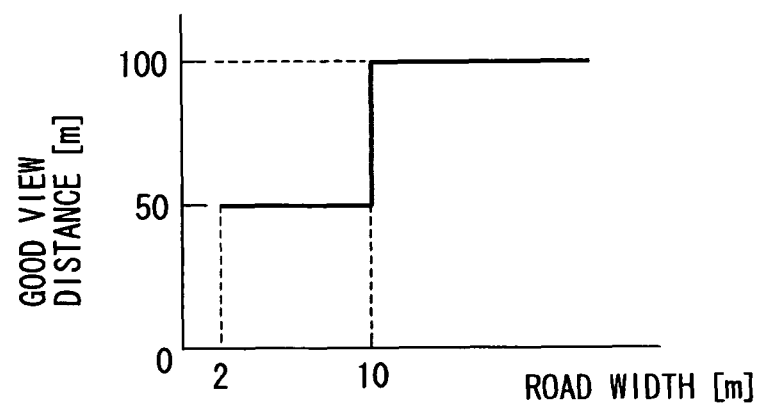
FIG. 6 is a graph showing a relationship between road widths and visibility distances corresponding to the road widths.
Figure 7:
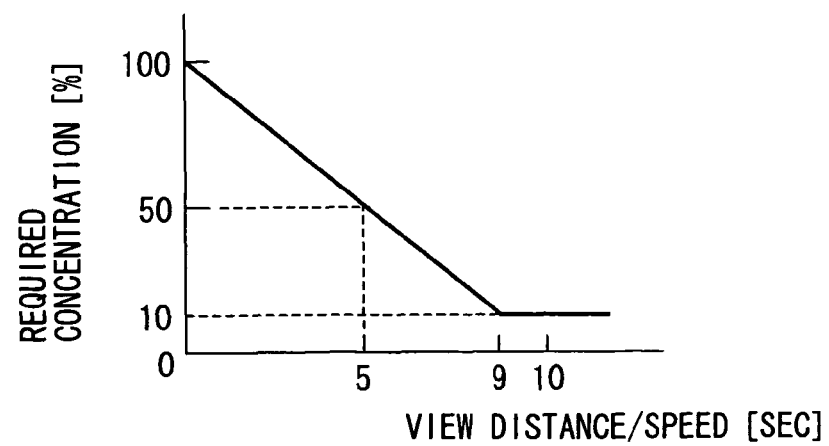
FIG. 7 is a graph showing a relationship between visibility distance time obtained by dividing a visibility distance by the vehicle speed of the subject vehicle and required concentration degrees.

First, for road width, according to the relationship shown in the graph of FIG. 6, a visibility (good view) distance corresponding to a detected road width is determined. The determined visibility distance is divided by a vehicle speed to determine visibility distance time (view distance time), which is time required by the subject vehicle to travel the good view distance. The relationship between the visibility distance time and required concentration degrees is shown in FIG. 7. By applying the determined visibility distance time to the relationship shown in the graph of FIG. 7, a first required concentration degree in percentage based on visibility distance time can be determined.

Shorter visibility distance time requires the driver of its subject vehicle to respond to an emergent event such as sudden deceleration of a preceding vehicle in shorter time from its recognition. Therefore, shorter visibility distance time demands a higher degree of concentration from the driver. Accordingly, the relationship shown in the graph of FIG. 7 is defined so that higher required concentration degree is calculated as visibility distance time becomes shorter.

The relationship between required concentration degree and parameter is defined so that the first required concentration degree, and second to fourth required concentration degrees described later are at least 0.1 (10%) or greater. This is because vehicle operation requires some concentration regardless of a road with good visibility and nonexistence of other vehicles in its vicinity.

Figure 8:
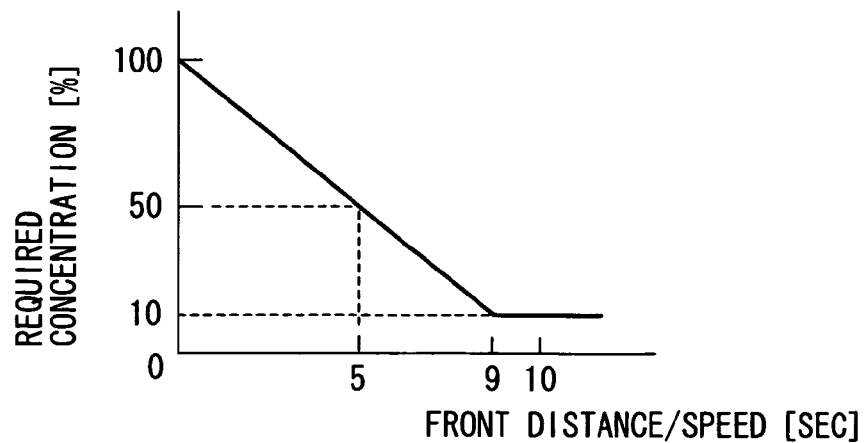
FIG. 8 is a graph showing a relationship between preceding vehicle inter-vehicle time obtained by dividing a vehicular distance from a preceding vehicle by the vehicle speed of the subject vehicle and required concentration degrees.
Figure 9:
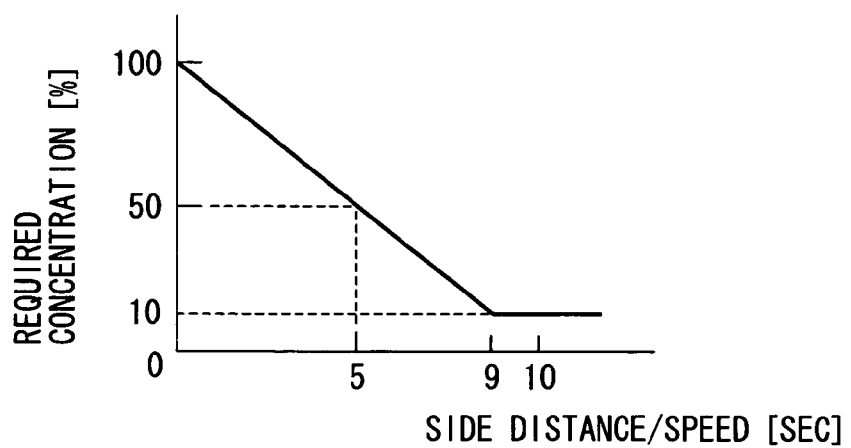
FIG. 9 is a graph showing a relationship between adjacent vehicle inter-vehicle time obtained by dividing a vehicular distance from a preceding vehicle by the vehicle speed of the subject vehicle and required concentration degrees.
Figure 10:
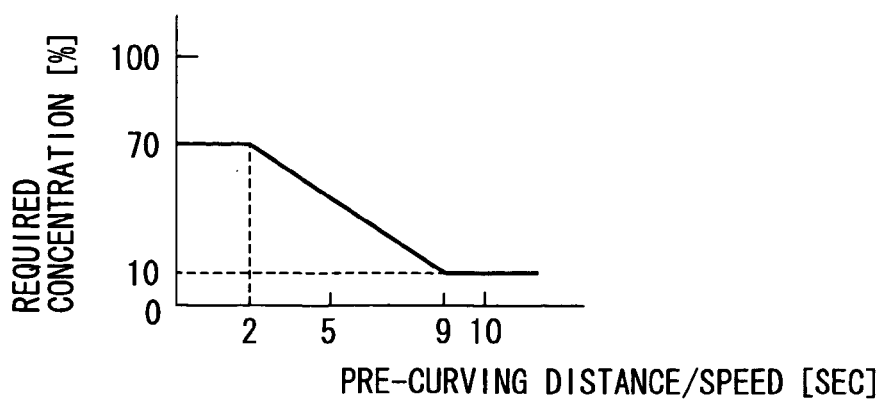
FIG. 10 is a graph showing a relationship between curve entrance margin time obtained by dividing a distance to a curve entrance point by the vehicle speed of the subject vehicle and required concentration degrees.

For a vehicular distance from a preceding vehicle, the vehicular distance is divided by a vehicle speed of the subject vehicle to determine preceding vehicle inter-vehicle time, which is time required by the subject vehicle to arrive at the position of the preceding vehicle. FIG. 8 is a graph showing the relationship between preceding vehicle inter-vehicle time and required concentration degrees. By applying the determined preceding vehicle inter-vehicle time to the graph of FIG. 8, a second required concentration degree based on preceding vehicle inter-vehicle time can be determined.

The relationship between preceding vehicle inter-vehicle time and required concentration degrees, like the relationship between visibility distance time and required concentration degrees, is defined so that required concentration degrees become higher as preceding vehicle inter-vehicle time becomes shorter. This is because the risk of colliding with a preceding vehicle becomes higher as preceding vehicle inter-vehicle time becomes shorter.

Also for a vehicular distance from an adjacent vehicle, a required concentration degree can be determined by the same method as that for a vehicular distance from a preceding vehicle. That is, a vehicular distance from a preceding vehicle is divided by a vehicle speed of the subject vehicle to determine adjacent vehicle inter-vehicle time, and according to the relationship shown in the graph of FIG. 9, a third required concentration degree based on adjacent vehicle inter-vehicle time is calculated. An adjacent vehicle traveling on an adjacent lane may change to the lane of the subject vehicle at any time, and when the adjacent vehicle has changed the lane, it becomes a preceding vehicle from the moment. Therefore, also for an adjacent vehicle, like a preceding vehicle, higher required concentration degrees are calculated for shorter adjacent vehicle inter-vehicle time.

Last, a distance from a curved road point is divided by a vehicle speed of the subject vehicle to determine curve entrance margin time, which is time required by the subject vehicle to enter a curbed road. By applying the determined curve entrance margin time to the relationship shown in the graph of FIG. 10, a fourth required concentration degree corresponding to the curve entrance margin time can be determined.

For cruise on a curved road, to prevent deviation from the road, the driver is required to have a higher degree of concentration than during the cruising on a straight road. Therefore, in the graph of FIG. 10, the relationship between curve entrance margin time and required concentration degrees is defined so that required concentration degrees become higher as curve entrance margin time becomes shorter.

The auto-cruise control is often performed in automobile roads such as expressways. In such a situation, to assure safe cruise of a subject vehicle, special care should be given to collision with other vehicles and deviation from the lane of the subject vehicle. The above visibility distance time, preceding vehicle inter-vehicle time, adjacent vehicle inter-vehicle time, and curve entrance margin time are parameters having correlation with the magnitude of risks of collision and lane deviation. As such risks become situationally higher, the driver is required to have a higher degree of concentration to appropriately perform driving operations to avoid the risks. Therefore, based on the above parameters, the required concentration degree corresponding to the surrounding environment in which the subject vehicle is placed can be adequately calculated.

The required concentration calculation unit 26 calculates the first to fourth required concentration degrees respectively according to the graphs shown in FIGS. 6 to 10. However, whether required concentration degrees other than the first required concentration degree calculated based on a road width are calculated depends on surrounding environments such as whether a preceding vehicle exists. The required concentration calculation unit 26, when only one required concentration degree is calculated, determines the calculated required concentration degree as a final required concentration degree. However, when plural required concentration degrees are calculated, they are integrated into a final required concentration degree.

In this embodiment, when plural required concentration degrees are calculated, the largest required degree of them is selected as a final required concentration degree to consider the plural required concentration degrees. This prevents calculation of an incorrectly low required concentration degree required from the driver based on the surrounding environments. However, to use plural required concentration degrees, besides selecting the largest value, for example, an average value or the sum of the plural required concentration degrees may be determined.

A control vehicle speed calculation unit 27 calculates a control vehicle speed in the auto-cruise control that enables safe cruise of the vehicle, based on the relationship between actual concentration degrees calculated by the actual concentration calculation unit 23, and required concentration degrees calculated by the required concentration calculation unit 26.

Specifically, it checks whether the actual concentration degree is greater than the required concentration degree by a specific value (e.g., 0.1) or more. When it is determined that the actual concentration degree is greater than the required concentration degree by the specific value or more, even when the subject vehicle is travel at a set vehicle speed, it can be determined that the driver of its subject vehicle has a concentration degree with which the safety of the vehicle can be sufficiently secured in the surrounding environments of the subject vehicle at that time. Therefore, in this case, the control vehicle speed calculation unit 27 does not calculate a control vehicle speed different from a set vehicle speed.

On the other hand, when it is determined that the difference between the actual concentration degree and the required concentration degree is less than the specific value or the required concentration degree exceeds the actual concentration degree, when the subject vehicle is travel at the set speed, the driver of its subject vehicle may lack in a concentration degree with which the driver can appropriately respond to a change in surrounding environments. Therefore, in such a case, the control vehicle speed calculation unit 27 determines a required concentration degree based on which the required concentration degree was finally calculated. It calculates a control vehicle speed until the determined required concentration degree becomes lower than the actual concentration degree by the specific value or more.

As has been described above, all the first to fourth required concentration degrees are calculated based on parameters (visibility distance time, preceding vehicle inter-vehicle time, adjacent vehicle inter-vehicle time, and curve entrance margin time) that change depending on vehicle speeds of the subject vehicle. Since a vehicle speed of the subject vehicle sooner or later matches a control vehicle speed, if a vehicle speed corresponding to a required concentration degree that is lower than driver's actual concentration degree by the specific value or more is determined, it can be used as the control vehicle speed. When a control vehicle speed is calculated in this way, the control vehicle speed is fed to a required throttle position calculation unit 28, along with a flag signal indicating that a control vehicle speed has been calculated.

The required throttle position calculation unit 28 calculates a required throttle position to be outputted to the engine control ECU 30, based on the control vehicle speed and flag signal, as well as detection signals from the throttle position degree sensor 4, the vehicle speed setting lever 5, the vehicle speed sensor 6, and the gear position sensor 7. Specifically, when the flag signal is turned off, the required throttle position calculation unit 28 calculates a required throttle position degree, based on a present opening degree of the throttle valve, a gear position, and vehicle speed so that the subject vehicle can travel at a speed set by the vehicle speed setting lever 5. That is, according to the deviation between a set vehicle speed and a present vehicle speed, in a present gear position, it determines a required throttle position degree for bringing the deviation close to zero, relative to a present throttle position degree. On the other hand, when the flag signal is turned on, it calculates a required throttle position, based on a present opening degree of the throttle valve, gear position, and vehicle speed so that the subject vehicle travels at a control vehicle speed calculated in the control vehicle speed calculation unit 27. A required throttle position degree corresponding to this control vehicle speed can be determined like a throttle position degree corresponding to a set vehicle speed.

Figure 11:
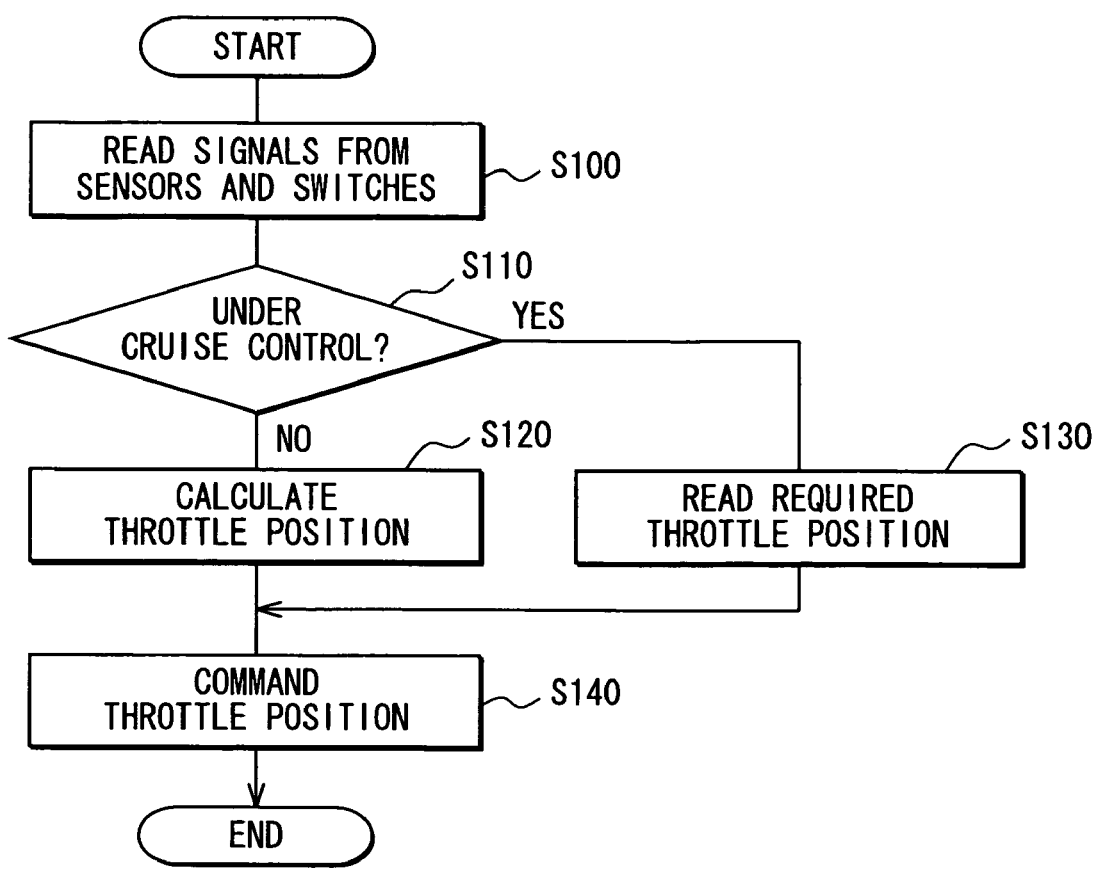
FIG. 11 is a flowchart showing control processing in an engine control ECU of the vehicle travel control system of the first embodiment.
Figure 12:
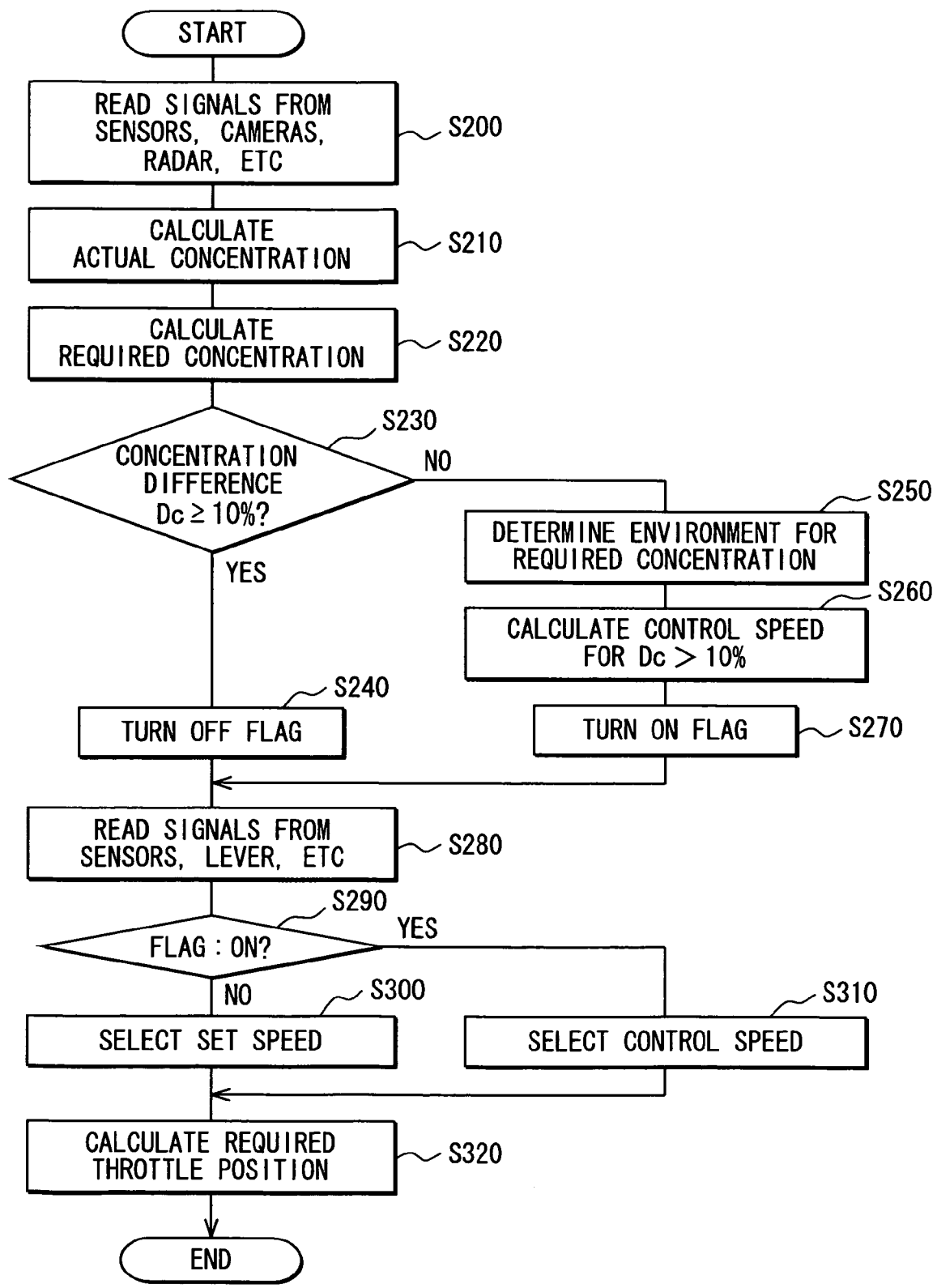
FIG. 12 is a flowchart showing control processing in an auto-cruise ECU of the vehicle travel control system of the first embodiment.

The engine control ECU 30 is programmed to execute control processing shown in FIG. 11, and the auto-cruise control ECU 20 is programmed to execute control processing shown in FIG. 12. The following describes control processing executed in the ECUs 20 and 30, based on these flowcharts.

The engine control ECU 30, as shown in FIG. 11, in S100, reads signals from the accelerator position sensor 1, the brake switch 2, the cruise control actuation switch 3, and the like. In S110, it checks whether the cruise control is in progress (under cruise control), based on these signals.

On determining that the cruise control is not in progress, it proceeds to S120 to calculate a command opening degree of the throttle valve, based on an operating state of the engine including the accelerator position sensor 1 and signals from various sensors for detecting cruise states of the vehicle. On the other hand, on determining that the cruise control is in progress, it proceeds to S130 to read a required throttle position degree outputted from the auto-cruise ECU 20.

In S140, it outputs a command signal of a throttle position degree to the electronic throttle device 35, based on one of the command opening degree of the throttle valve calculated in S120, or the required throttle position degree read in S130.

The auto-cruise ECU 20, as shown in FIG. 12, in S200, acquires information necessary to calculate an actual concentration degree and a required concentration degree by reading signals from the vehicle speed sensor 6, eye condition detection camera 8, steering sensor 9, lane information recognition camera 10, front recognition radar 11, and navigation system 12.

In S210, according to the relationships shown in the graphs of FIGS. 2 to 5, it calculates the first to fourth actual concentration degrees. Next, selects the smallest actual concentration degree of the calculated first to fourth actual concentration degrees as a final actual concentration degree. In S220, it calculates the first to fourth required concentration degrees according to the relationships shown in the graphs of FIGS. 6 to 10. At this time, besides the first required concentration degree based on visibility distance time, when at least one of the second to fourth required concentration degrees has been calculated, it selects the largest required concentration degree of the plural required concentration degrees as a final required concentration degree.

In S230, whether the actual concentration degree is greater than the required concentration degree by a specific value (0.1) or more, that is, whether a difference Dc in the actual and required concentration degrees is equal to or greater than 10%, is checked. If it is determined that the actual concentration degree is greater than the required concentration degree by the specific value or more, it proceeds to S240 to turn off a flag indicating that the control vehicle speed has been calculated based on the relationship between the actual concentration degree and the required concentration degree. On the other hand, when the required concentration degree is greater than a value that is smaller than the actual concentration degree by the specific value, it proceeds to S250 to determine any of the first to fourth required concentration degrees based on which the required concentration degree has finally been calculated. In S260, it calculates a control vehicle speed until the determined required concentration degree is smaller than the actual concentration degree by the specific value (0.1), that is, the difference Dc exceeds 10%. In S270, it turns on a flag indicating that the control vehicle speed has been calculated.

In S280, it acquires information necessary to calculate a required throttle position degree by reading signals from the throttle position degree sensor 4, vehicle speed setting lever 5, vehicle speed sensor 6, and gear position sensor 7. In S290, it checks whether the flag is ON. In the determination processing, on determining that the flag is OFF, it proceeds to processing of S300. On determining that the flag is ON, it proceeds to processing of S310.

In S300, it sets a setting vehicle speed set by the vehicle speed setting lever 5 as a vehicle speed for calculating a required throttle position degree. On the other hand, in S310, it sets the control vehicle speed calculated in S260 as a vehicle speed for calculating a required throttle position degree. In S320, it calculates a required throttle position degree outputted to the engine control ECU 30, based on the set vehicle speed or the control vehicle speed set in S300 or S310.

A control example by the vehicle travel control system is described with reference to waveform diagrams from FIGS. 13A to 16C. FIGS. 13A, 14A, 15A, 16A show ON/OFF states of cruise control by the cruise control actuation switch 3, changes in vehicle speed (solid line) of the subject vehicle, set vehicle speed (dot-and-chain line), actual concentration degree (solid line), and required concentration degree (dotted line). FIGS. 13B, 14B, 15B, 16B show the width of road (dotted line) in which the subject vehicle travels, vehicular distance from a preceding vehicle (front distance: solid line), vehicular distance from an adjacent vehicle (side distance: solid line), and distance from a curve entrance point (pre-curving distance: dot-and-chain line). FIGS. 13C, 14C, 15C and 16C show driver's eyelid opening degrees and eye direction (sight line). For eye direction, left angles with respect to the traveling direction of the vehicle are represented by positive values, and right angles by negative values.

Case 1 shown in FIGS. 13A to 13C shows a situation in which the auto-cruise control has been started by a driver's operation. In this case, because of awareness of starting the auto-cruise control, the driver usually keeps a high degree of concentration such as attention to surrounding traffic conditions. Therefore, since the eyelid opening degree is almost close to the maximum value as shown in 13C, and the eye direction is periodically directed to the lateral direction to confirm surrounding situations while basically paying attention to traveling directions of the vehicle, a high actual concentration degree is calculated. As shown in FIG. 13A, since the actual concentration degree is greater than the required concentration degree by the specific value or more, the vehicle is subjected to cruise control at the set vehicle speed.

Case 2 shown in FIGS. 13A to 13C show a situation in which the vehicular distance from the adjacent vehicle traveling on the adjacent lane has become short during the auto-cruise control. For example, when the subject vehicle travels on a road having plural lanes, and the adjacent vehicle exists several meters ahead of the subject vehicle, as shown in FIG. 13B, a very short vehicular distance (side distance) from the adjacent vehicle is detected. As a result, even though the actual concentration degree does not decrease as much as that in the situation of the case 1, the difference between the actual concentration degree and the required concentration degree becomes small because of the increased required concentration degree, and sometimes the required concentration degree exceeds the actual concentration degree.

Therefore, the control vehicle speed is calculated so that the required concentration degree based on the vehicular distance from the adjacent vehicle (that is, based on adjacent vehicle inter-vehicle time) is lower than the actual concentration degree by the specific value or more, and the vehicle speed of the subject vehicle is controlled to match the control vehicle speed. As a result, as shown in FIG. 13A, the vehicle speed of the subject vehicle decreases. Because of a decrease in the vehicle speed of the subject vehicle, the required concentration degree calculated based on the vehicular distance from the adjacent vehicle tends to decrease. Furthermore, as the vehicle speed of the subject vehicle decreases, since the vehicular distance from the adjacent vehicle becomes long gradually, before long, the required concentration degree decreases to below the specific value of actual concentration.

Figure 14A:
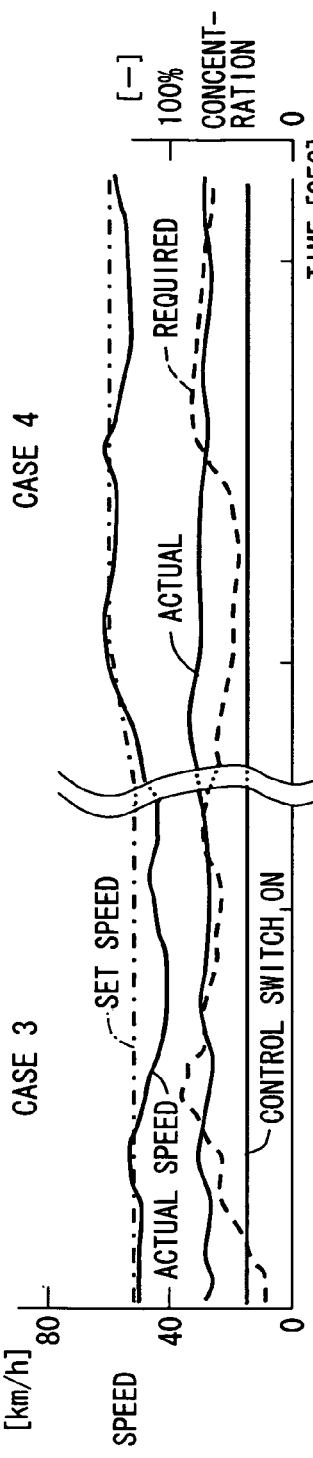
FIGS. 14A to 14C show examples of control in a situation (case 3) in which road width becomes narrow during auto-cruise control and curve road appear successively, a situation (case 4) in which a vehicular distance from a preceding vehicle traveling on the lane of the subject vehicle becomes short during auto-cruise control.
Figure 14B:
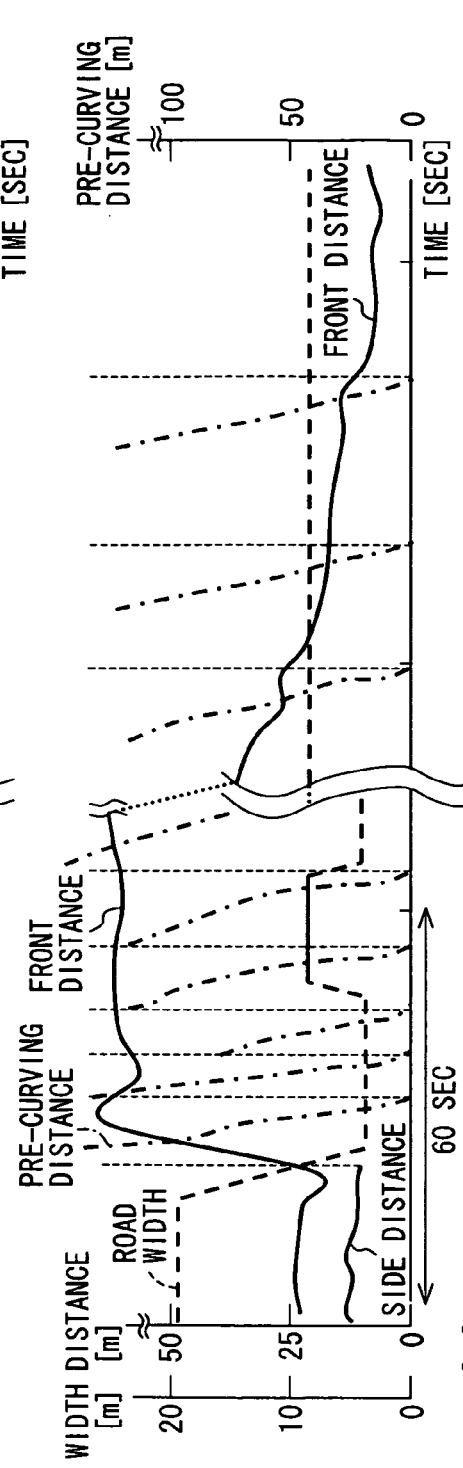
Figure 14C:
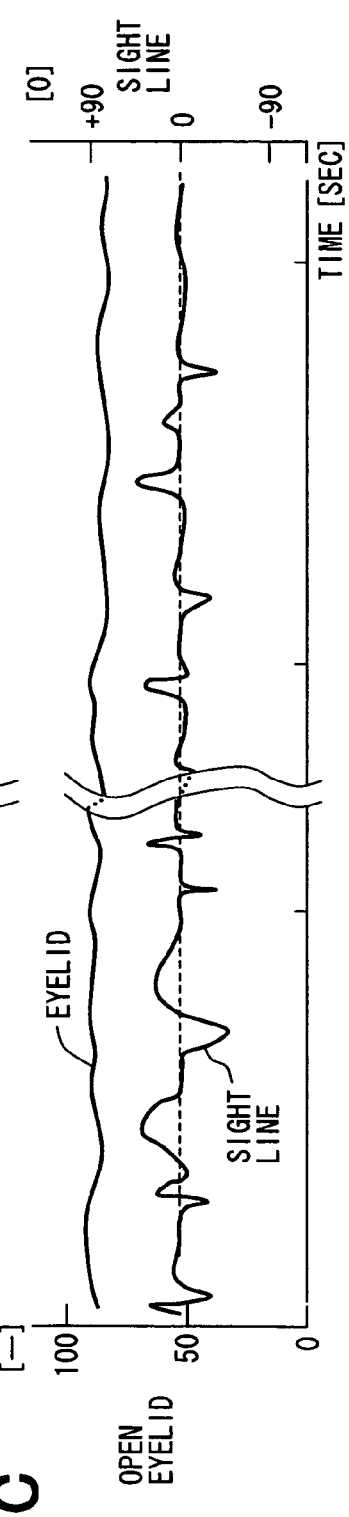

Case 3 shown in FIGS. 14A to 14C shows a situation in which the road width narrows during the auto-cruise control, and the curved roads appear successively. In this case, the narrowed road width shortens visibility distance time, thereby reducing the difference between the required concentration degree and the actual concentration degree or resulting in the required concentration degree exceeding the actual concentration degree. Furthermore, the successively appearing curved roads cause the required concentration degree based on the distance from a curve (curve entrance margin time) to be increased with high frequency and reduce the difference from the actual concentration degree.

Therefore, the control vehicle speed is calculated so that any of the required concentration degrees calculated based on the visibility distance time and the curve entrance margin time is decreased to below the specific value of the actual concentration. As a result, since the vehicle speed of the subject vehicle is controlled to match the control vehicle speed, the cruise speed of the subject vehicle becomes lower than the set vehicle speed. Consequently, since the required concentration degree decreases gradually, the control vehicle speed changes to increase. Finally, when the actual concentration degree has become greater than the required concentration degree by the specific value or more, the control vehicle speed matches the set vehicle speed.

Case 4 shown in FIGS. 14A to 14C shows a situation in which the vehicular distance (front distance) from the preceding vehicle traveling on the same lane as the subject vehicle has become short during the auto-cruise control. That is, as shown in FIG. 14B, the preceding vehicle exists on the same lane as that of the subject vehicle, and as the vehicular distance from the preceding vehicle becomes shorter, the required concentration degree increases as shown in FIG. 14A. As a result, the difference between the actual concentration degree and the required concentration degree become short. In some cases, the required concentration degree exceeds the actual concentration degree.

Therefore, the control vehicle speed is calculated so that the required concentration degree calculated based on the preceding vehicle inter-vehicle time is lower than the actual concentration degree by the specific value or more, and the vehicle speed is controlled to match the control vehicle speed. As a result, as shown in FIG. 14A, the vehicle speed of the subject vehicle decreases. Because of a decrease in the vehicle speed of the subject vehicle, the required concentration degree calculated based on the preceding vehicle inter-vehicle time tends to decrease. Furthermore, as the vehicle speed of the subject vehicle decreases, since the vehicular distance from the adjacent vehicle becomes long gradually, before long, the required concentration degree decreases to below the specific value of the actual concentration, with the result that the control vehicle speed converges to the set vehicle speed.

Figure 15A:
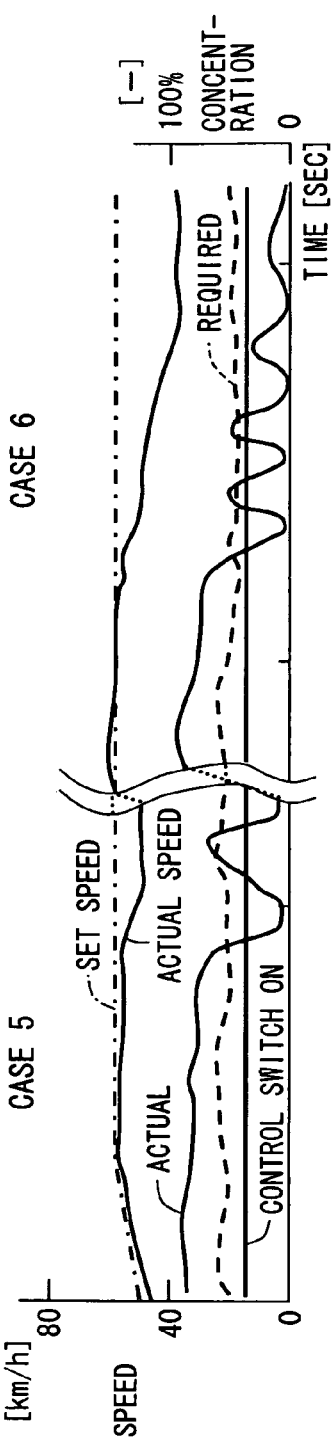
FIGS. 15A to 15C show a situation (case 5) in which a driver looked aside during auto-cruise control, and a situation (case 6) in which the driver of its subject vehicle does not open the eyelids completely during auto-cruise control.
Figure 15B:
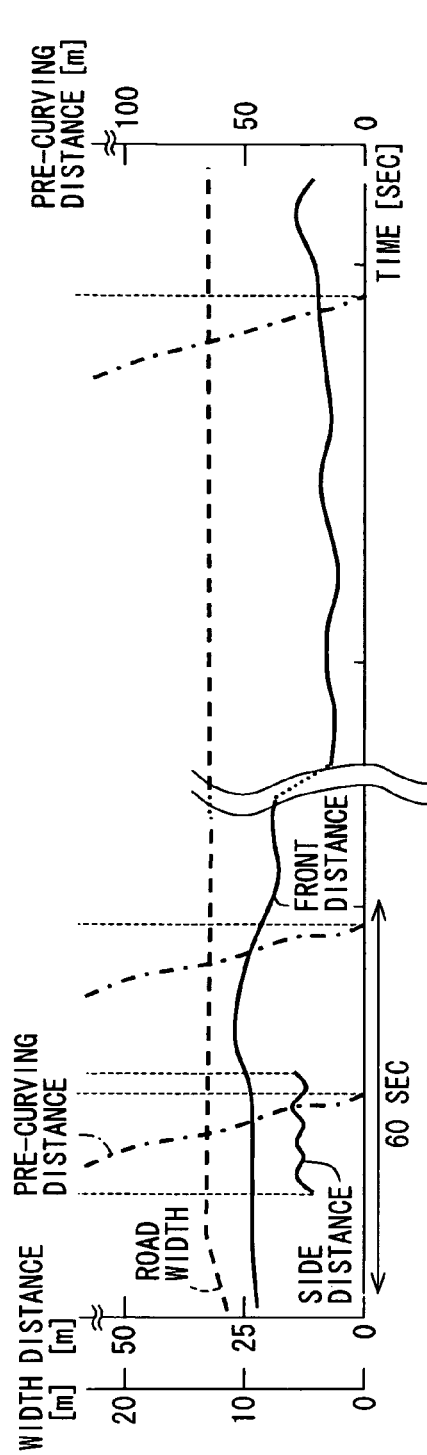
Figure 15C:
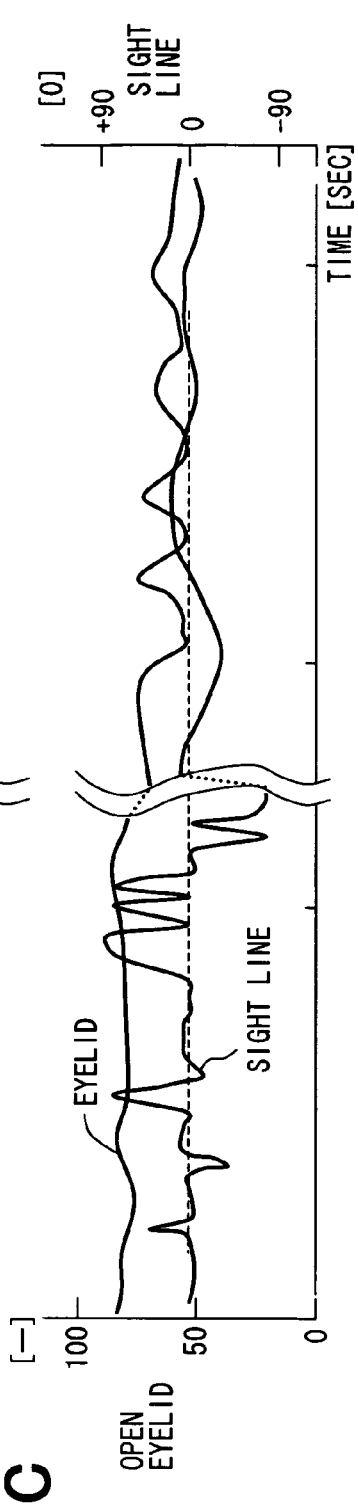

Case 5 shown in FIGS. 15A to 15C shows a situation in which the driver looked aside during auto-cruise control. In this case, as shown in FIG. 15C, the angle of eye direction becomes large continuously, and its time ratio also increases. Therefore, as shown in FIG. 15A, the calculated actual concentration degree decreases greatly. As a result, since the actual concentration degree becomes lower than the required concentration degree, the control vehicle speed lower than the set vehicle speed is calculated to decrease the required concentration degree to below the actual concentration degree. Since the subject vehicle is controlled to match the control vehicle speed, safety is increased.

Case 6 shown in FIG. 15A to 15C shows a situation in which the driver of its subject vehicle does not open the eyelids completely during auto-cruise control. In this case, the eyelid opening degrees decrease and no change occurs in the eye direction for confirming the surrounding of the subject vehicle. As shown in FIG. 15A, the low actual concentration degree is calculated. As a result, since the actual concentration degree falls below the required concentration degree, the control vehicle speed lower than the set vehicle speed is calculated to decrease the required concentration degree. As a result, the subject vehicle travels at the lower speed.

Case 7 shown in FIGS. 16A to 16C shows a state in which the driver keeps a high concentration degree during the auto-cruise control. In this case, the driver's eyelid opening degree and the actual concentration degree calculated based on the eye direction hold high values. Therefore, as shown in FIG. 16A, the actual concentration degrees are much higher than the required concentration degrees. Therefore, the normal auto-cruise control is performed in the subject vehicle, and the vehicle speed of the subject vehicle is almost equal to the set speed.

As described above, according to the vehicle travel control system of this embodiment, during the auto-cruise control, based on the relationship between the actual concentration degree indicating the driver's concentration degree and the required concentration degree determined from the surrounding environments, the vehicle travel control system checks whether the possibility that the driver's actual concentration degree is insufficient in terms of safety has occurred in the surrounding environments of the subject vehicle. When that possibility has occurred, to increase safety, even during the auto-cruise control, the speed of the subject vehicle is controlled to match the control vehicle speed lower than the set vehicle speed. As a result of this, even when the driver's state and the surrounding environments change, the vehicle can be safely travel all the time.

Second Embodiment

The vehicle travel control system of the second embodiment is directed to adaptive cruise control, which performs control to follow a preceding vehicle, if any, at a specific vehicular distance. This system is shown in FIG. 17, in which the same components as in the first embodiment are assigned the same reference numerals.

Figure 17:
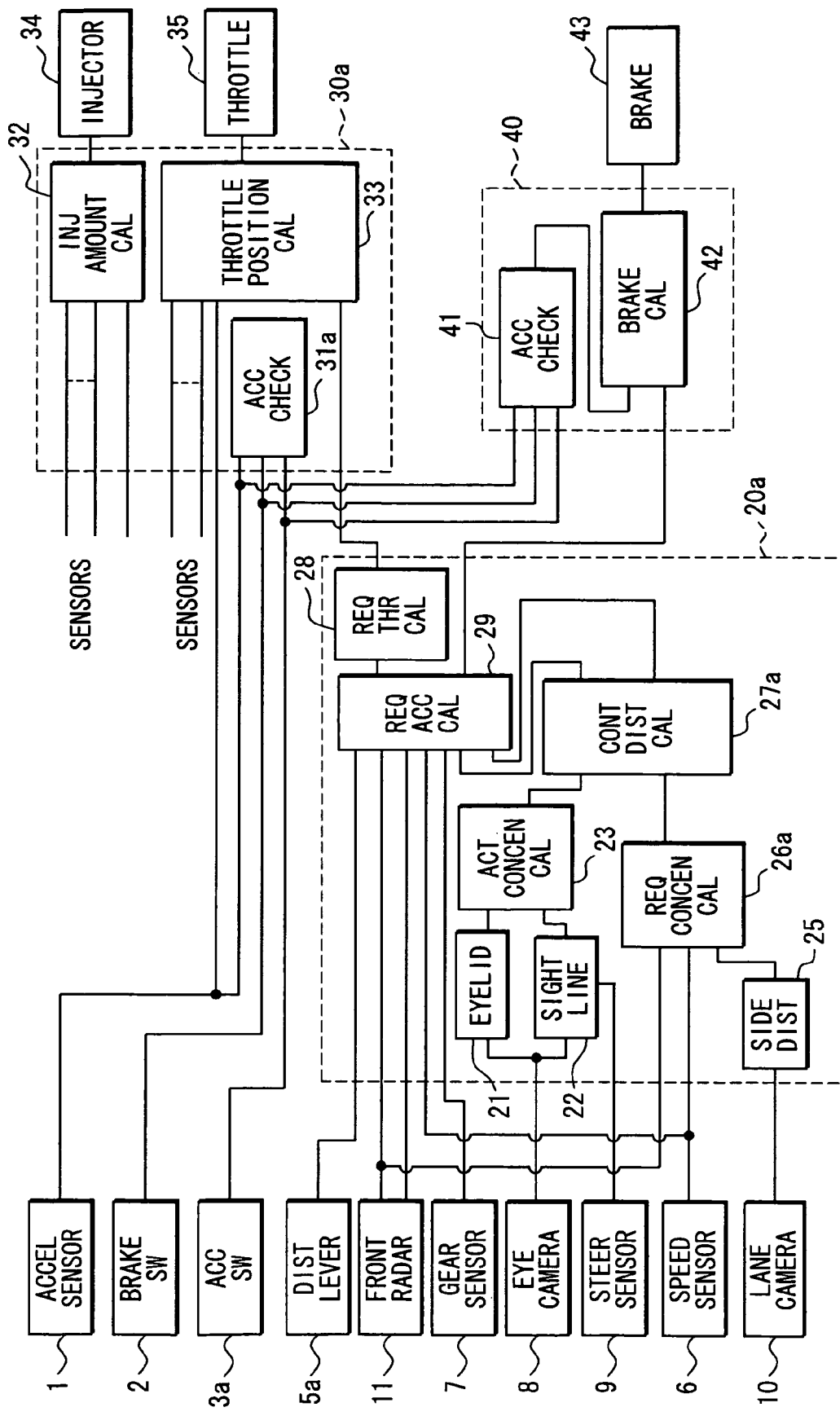
FIG. 17 is a block diagram showing a vehicle travel control system of a second embodiment of the present invention.

As shown in FIG. 17, the vehicle travel control system includes a brake control ECU 40 in addition to an ACC-ECU 20a as an adaptive cruise controller and an engine control ECU 30a. This is because the subject vehicle has to be not only accelerated but also decelerated to follow a preceding vehicle while maintaining a specific vehicular distance relative to the preceding vehicle.

The configuration of the engine control ECU 30a and signals inputted to the engine control ECU 30a are almost the same as those of the engine control ECU 30 in the first embodiment. However, the vehicle travel control system of this embodiment performs adaptive cruise control. Therefore, the subject vehicle is provided with an adaptive cruise control (ACC) actuation switch 3a that outputs an indication signal indicating the start/end of adaptive cruise control, and the signal are inputted to the engine control ECU 30.

The engine control ECU 30a, in an adaptive cruise control actuation check unit 31a, checks whether adaptive cruise control is in progress, based on signals from the accelerator position sensor 1 and the brake switch 2 in addition to the adaptive cruise control actuation switch 3a, and outputs the determination result to the throttle position calculation unit 33. Components of the engine control ECU 30a are the same as those in the first embodiment.

The ACC-ECU 20a, when a preceding vehicle exists on the same lane of the subject vehicle, calculates an acceleration (including deceleration) of the subject vehicle, determines and outputs a required throttle position degree for realizing the acceleration, and outputs a brake actuation command signal, so that the subject vehicle follows the preceding vehicle at a set vehicular distance determined according to a vehicle speed. However, when the subject vehicle travels to follow the preceding vehicle at the set vehicular distance, it sometimes arises that the safety of the subject vehicle cannot be sufficiently secured with the driver's actual concentration degree and the required concentration degree required from the driver in the surrounding environments of the subject vehicle. In this instance, the ACC-ECU 20a calculates a control vehicular distance longer than the set vehicular distance, and changes the control content of adaptive cruise control to travel the subject vehicle to follow the preceding vehicle to the control vehicular distance.

To execute this control processing, the ACC-ECU 20a receives signals from a vehicular distance setting lever 5a, vehicle speed sensor 6, gear position sensor 7, eye condition detection camera 8, steering sensor 9, lane information recognition camera 10, and front recognition radar 11.

The vehicular distance setting lever 5a adjusts a vehicular distance to be set according to driver's preference during the cruise to follow the preceding vehicle. Although the vehicular distance to be set depends on the vehicle speed of the subject vehicle as a rule as described above, for example, the vehicular distance to be set can be adjusted long or short by operating the vehicular distance setting lever 5a. The vehicle speed sensor 6, gear position sensor 7, eye condition detection camera 8, steering sensor 9, lane information recognition camera 10, and front recognition radar 11 are the same as those in the first embodiment described above.

Like the auto-cruise ECU 20 in the first embodiment, the ACC-ECU 20a also includes the actual concentration calculation unit 23, which detects by calculation the driver's actual concentration degree, based on the driver's eye condition. A method for detecting the actual concentration degree is the same as that in the first embodiment.

A required concentration calculation unit 26a of the ACC-ECU 20a, as information about the surrounding environment of the subject vehicle, uses preceding vehicle inter-vehicle time based on the vehicular distance from the preceding vehicle and adjacent vehicle inter-vehicle time based on the vehicular distance from the adjacent vehicle to calculate the required concentration degree required from the driver to safely travel the subject vehicle. The adaptive cruise control drives the subject vehicle to follow the preceding vehicle. Therefore, when the preceding vehicle is suddenly decelerated, or the adjacent vehicle changes the lane from an adjacent lane to the lane of the subject vehicle, operation intervention of the driver may be required. The magnitude of risk of needing such operation intervention by the driver can be evaluated by inter-vehicle time from the preceding vehicle and inter-vehicle time from the adjacent vehicle. A method for determining a required concentration degree from the preceding vehicle inter-vehicle time and the adjacent vehicle inter-vehicle time, and a method for finally calculating one required concentration degree by integrating plural required concentration degrees when they are obtained are the same as those described in the first embodiment.

The control vehicular distance calculation unit 27a calculates the control vehicular distance that allows the subject vehicle to travel safely to follow the preceding vehicle, based on the relationship between the actual concentration degree calculated by the actual concentration calculation unit 23 and the required concentration degree calculated by the required concentration calculation unit 26a.

Specifically, it checks whether the actual concentration degree is greater than the required concentration degree by the specific value (e.g., 0.1) or more. When it is determined that the actual concentration degree is greater than the required concentration degree by the specific value or more, when the subject vehicle is driven to follow a preceding vehicle at the vehicular distance to be set, it can be determined that the driver of its subject vehicle has a concentration degree with which the safety of the subject vehicle can be sufficiently secured at the vehicular distance from the preceding vehicle and the vehicular distance from an adjacent vehicle. Therefore, in this case, the control vehicular distance calculation unit 27a does not calculate a control vehicular distance different from the vehicular distance to be set.

However, when it is determined that the difference between the actual concentration degree and the required concentration degree is less than the specific value, or the required concentration degree exceeds the actual concentration degree, when the subject vehicle is driven to follow the preceding vehicle at the vehicular distance to be set, the concentration degree of the driver of its subject vehicle may lack such a concentration degree as to enable adequate response to a change in the surrounding environment such as sudden deceleration of the preceding vehicle or lane change of the adjacent vehicle. Therefore, the control vehicular distance calculation unit 27a determines the required concentration degree based on which the required concentration degree is finally calculated. It calculates the control vehicular distance until the determined required concentration degree becomes lower than the actual concentration degree by the specific value or more.

The preceding vehicle inter-vehicle time and the adjacent vehicle inter-vehicle time changes according to the vehicular distance between the preceding vehicle and the subject vehicle, or are expected to change. The actual vehicular distance between the subject vehicle and the preceding vehicle matches the control vehicular distance sooner or later. Therefore, by finding the control vehicular distance corresponding to the required concentration degree that is lower than the driver's actual concentration degree by the specific value or more and performing control to match the control vehicular distance, a situation can be attained in which the driver's actual concentration degree becomes greater than the required concentration degree by the specific value or more. The control vehicular distance calculation unit 27a, when calculating the control vehicular distance, outputs the flag signal indicating the control vehicular distance has been calculated, to request the acceleration calculation unit 29 together with the control vehicular distance.

The required acceleration calculation unit 29 calculates the required acceleration for matching a present vehicular distance from the preceding vehicle to the vehicular distance to be set or the control vehicular distance, based on detection signals from the vehicular distance setting lever 5*a*, vehicle speed sensor 6, gear position sensor 7, and front recognition radar 11, in addition to the control vehicular distance and flag signal. Specifically, when the above flag signal is OFF, the required acceleration calculation unit 29 calculates a required acceleration for matching the vehicular distance between the subject vehicle and the preceding vehicle to the vehicular distance to be set that is determined by the vehicle speed of the subject vehicle and adjusted by the vehicular distance setting lever 5*a*. According to the deviation between the vehicular distance to be set and the present vehicular distance, it finds a required acceleration for bringing the deviation near to zero at the present gear position, taking a speed relative to the preceding vehicle into account. On the other hand, when the flag signal is turned on, the required acceleration calculation unit 29 calculates a required acceleration, based on the present vehicular distance, relative velocity, and gear position so that the vehicular distance between the subject vehicle and the preceding vehicle matches the control vehicular distance calculated in the control vehicular distance calculation unit 27*a*.

When a positive acceleration is calculated as the required acceleration in the required acceleration calculation unit 29, the required throttle position calculation unit 28 calculates a throttle position degree for realizing the required acceleration and outputs it to the engine control ECU 30*a* as the required throttle position degree. On the other hand, when a negative acceleration is calculated as the required acceleration, the required throttle position calculation unit 28 calculates a required throttle position degree for providing the negative acceleration, and the required acceleration calculation unit 29 outputs a brake actuation command signal to the brake control ECU 40 if necessary.

The brake control ECU 40, like the engine control ECU 30*a*, includes an adaptive cruise control actuation check unit 41 that checks whether the adaptive cruise is in progress. When it is determined in the adaptive cruise control actuation check unit 41 that adaptive cruise is in progress, the brake control ECU 40 outputs an actuation permission signal to a brake actuator command value calculation unit 42.

On receiving a brake actuation command signal from the ACC-ECU 20*a* while receiving the actuation permission signal, the brake actuator command value 25 calculation unit 42 outputs a driving signal to a brake actuator 43, based on the brake actuation command signal.

The brake actuator 43 generates brake fluid pressure for actuating a braking device provided in each wheel of the subject vehicle to apply it to the braking device of each wheel, and causes the subject vehicle to generate braking force to decelerate the subject vehicle by a relatively large deceleration. Brake fluid pressure and its application time in the brake actuator 43 are controlled according to a brake actuation command signal from the ACC-ECU 20*a*.

Figure 18:
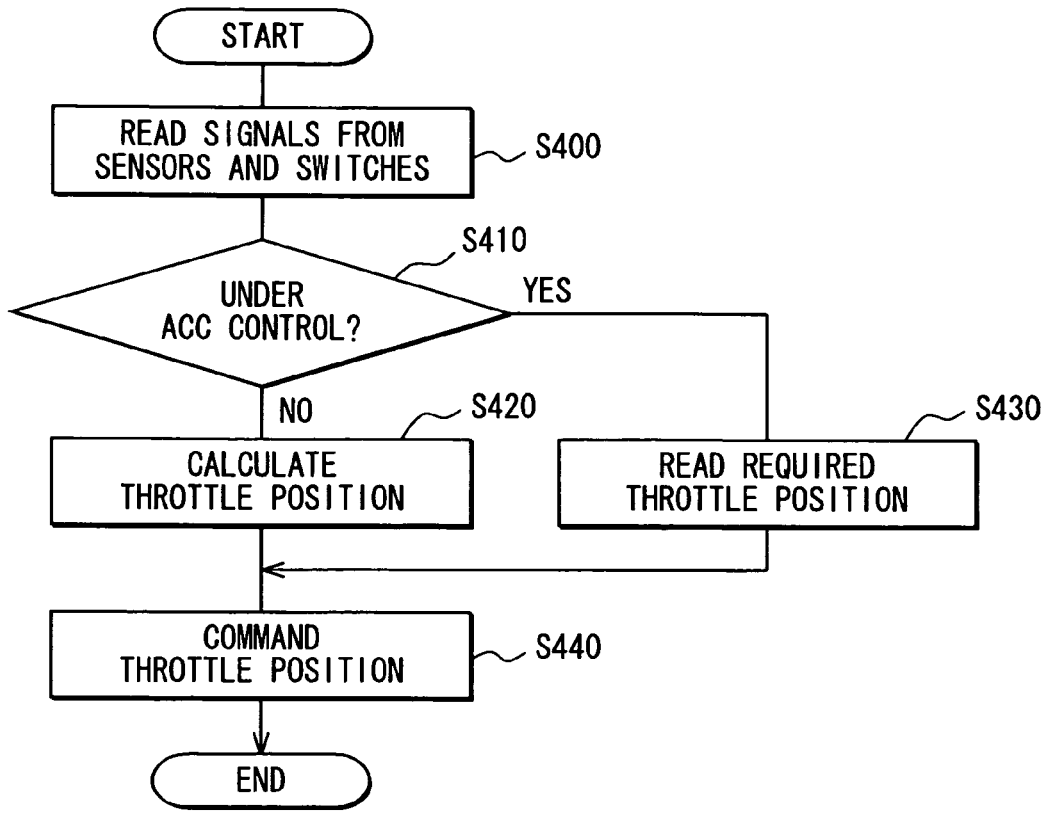
FIG. 18 is a flowchart showing control processing in an engine control ECU of the second embodiment.
Figure 19:
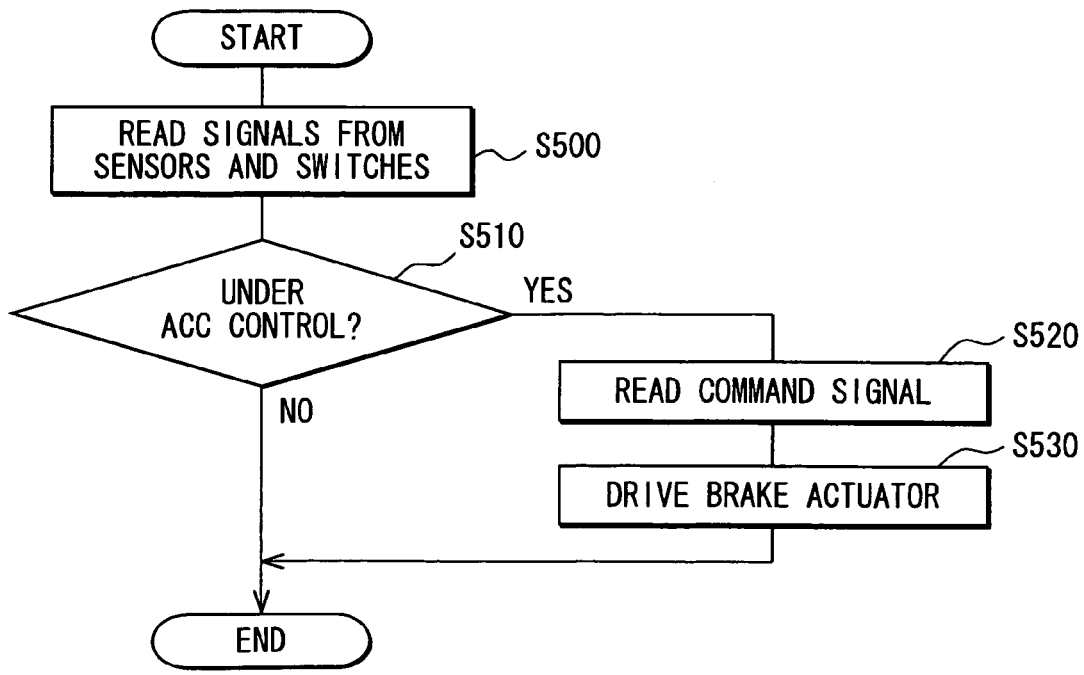
FIG. 19 is a flowchart showing control processing in a brake control ECU of the second embodiment.
Figure 20:
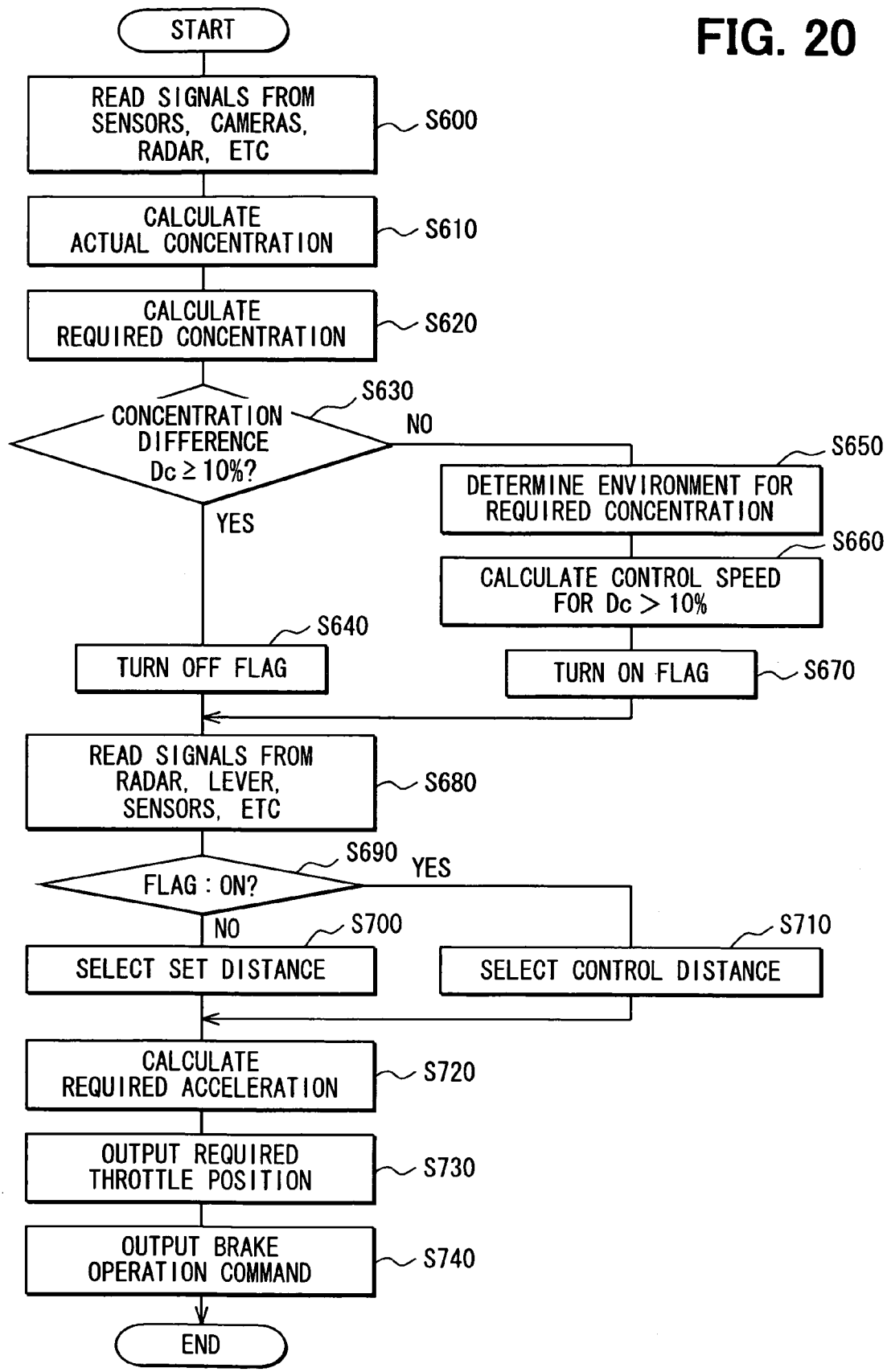
FIG. 20 is a flowchart showing control processing in an ACC-ECU of a vehicle travel control system of the first embodiment.

The ECUs 20*a*, 30*a* and 40 of the vehicle travel control system are programmed to execute control processing shown in FIGS. 18 to 20.

The engine control ECU 30*a*, as shown in FIG. 18, in S400, reads signals from the accelerator position sensor 1, brake switch 2, and adaptive cruise control actuation switch 3*a* (ACC switch). In S410, it checks whether the adaptive cruise control is in progress (the system is under auto-cruise control).

On determining that ACC control is not in progress, it proceeds to S420 to calculate a command opening degree of the throttle valve, based on an operating state of the engine including the accelerator position sensor 1 and various sensors for detecting a cruise state of the vehicle. On the other hand, on determining that ACC control is in progress, it proceeds to S430 to read a required throttle position degree outputted from the ACC-ECU 20*a*.

In S440, it outputs a command signal of the throttle position degree to the electronic throttle device 35, based on any of the command opening degree of the throttle valve calculated in S420 or the required throttle position degree read in S430.

The brake control ECU 40, as shown in FIG. 19, in S500, reads signals from the accelerator position sensor 1, brake switch 2, and ACC switch 3*a*. In S510, it checks whether ACC control is in progress, based on these signals.

When determining that ACC control is not in progress, it immediately terminates the processing. On the other hand, on determining that ACC control is in progress, it proceeds to S520 to read the brake actuation command signal outputted from the ACC-ECU 20*a*. In S530, based on the read brake actuation command signal, it outputs a driving signal to the brake actuator 43 to generate braking force in the subject vehicle.

The ACC-ECU 20*a*, as shown in FIG. 20, in S600, reads signals from the vehicle speed sensor 6, eye condition detection camera 8, steering sensor 9, lane information recognition camera 10, and front recognition radar 11 to acquire information necessary to calculate the actual concentration degree and the required concentration degree.

In S610, in the similar manner as in the first embodiment, it calculates the first to fourth actual concentration degrees according to the relationships shown in the graphs of FIGS. 2 to 5. Next, it selects the smallest actual concentration degree of the calculated first to fourth actual concentration degrees as the final actual concentration degree. In S620, it calculates the required concentration degree based on the preceding vehicle inter-vehicle time according to the relationships shown in the graphs of FIGS. 8 and 9 along with calculating the required concentration degree based on the adjacent vehicle inter-vehicle time.

When the subject vehicle is controlled to follow a preceding vehicle, a preceding vehicle always exists. However, adjacent vehicles may or may not exist. Therefore, when only the required concentration degree based on the preceding vehicle inter-vehicle time is calculated, it is used as the final required concentration degree. When both required concentration degrees are calculated, the larger required concentration degree is selected and used as the final required concentration degree.

In S630, it is checked whether the actual concentration degree is greater than the required concentration degree by the specific value (0.1) or more, that is, Dc≧10%. When it is determined that the actual concentration degree is greater than the required concentration degree by the specific value or more, it proceeds to S640 to turn off the flag indicating that the control vehicular distance has been calculated based on the relationship between the actual concentration degree and the required concentration degree. On the other hand, when the required concentration degree is greater than the value that is smaller than the actual concentration degree by the specific value, it proceeds to S650 to determine the required concentration degree based on which the required concentration degree was finally calculated. In S660, it calculates the control vehicular distance until the determined required concentration degree decreases to less than the value that is smaller than the actual concentration degree by the specific value (0.1). In S670, it turns off the flag indicating that the control vehicular distance has been calculated.

In S680, it reads signals from the vehicular distance setting lever 5a, vehicle speed sensor 6, gear position sensor 7, and front recognition radar 11 to acquire information necessary to calculate a required acceleration. In S690, it checks whether the flag is ON. On determining that the flag is OFF, it proceeds to S700, and on determining that the flag is ON, it proceeds to S710.

In S700, it sets the vehicular distance to be set that is determined by the vehicle speed of the subject vehicle and adjusted by the vehicular distance setting lever 5a, as the vehicular distance for calculating the required acceleration. On the other hand, in S710, it sets the control vehicular distance calculated in S660 as the vehicular distance for calculating the required acceleration.

In S720, it calculates the required acceleration for matching the present vehicular distance to the vehicular distance to be set or the control vehicular distance set in S600 or S610. In S730, it calculates the required throttle position degree outputted to the engine control ECU 30a, based on the required acceleration. Furthermore, in S740, it generates the brake actuation command to be outputted to the brake control ECU 40, based on the required acceleration.

As has been described above, according to the vehicle travel control system of the second embodiment, in the case of performing the adaptive cruise control to drive the subject vehicle to follow a preceding vehicle with a specific vehicular distance, when the safety of the vehicle is considered insufficient based on the relationship between the driver's actual concentration degree and the required concentration degree determined from preceding vehicle inter-vehicle time and the like, the control content of the adaptive cruise control is changed to lengthen the vehicular distance. This contributes to an increase in the cruise travel safety of the vehicle during the adaptive cruise control.

Although the second embodiment assumes that the subject vehicle is traveling to follow the preceding vehicle, as a matter of course, it is possible that no preceding vehicle exist ahead of the subject vehicle. In this case, preferably, the vehicle travel control system executes the auto-cruise control described in the first embodiment, and controls the vehicle speed of the subject vehicle, based on the relationship between the actual concentration degree and the required concentration degree.

The present invention is not limited to the above embodiments and may be performed in various ways without departing from the purport of the present invention.

For example, in the first and second embodiments, when the safety of the vehicle is considered insufficient based on the relationship between the actual concentration degree indicating the driver's actual concentration degree and the required concentration degree determined from surrounding environments, the control contents are changed by decreasing the cruise speed of the vehicle or lengthening the vehicular distance from the preceding vehicle.

However, the control contents may be changed based on only the actual concentration degree. In the auto-cruise control and the adaptive cruise control, since the vehicle can be automatically driven without relying on the driver's accelerator operation, the driver's operation load is significantly reduced. On the other hand, when a surrounding situation changes, the driver is required to intervene in operation to respond immediately to the situation change. From such a standpoint, when the driver's actual concentration degree decreases to such an extent that the driver cannot immediately perform operation intervention, to increase the cruise safety of the vehicle, the control contents may be changed by decreasing the cruise speed of the vehicle or lengthening the vehicular distance from the preceding vehicle. In this case, safety in the case of performing the auto-cruise control and the adaptive cruise control can be increased.

In the first and the second embodiment, the actual concentration degree being driver's actual concentration was detected by calculation based on the driver's eye condition such as a driver's eyelid opening degree, eyelid opening degree and duration, driver's eye direction and duration when the driver's eye direction is a specific angle or more off the traveling direction of the vehicle, and the time ratio that driver's eye direction is a specific angle or more off the traveling direction of the vehicle.

However, a driver's actual concentration degree can be detected based on other parameters along with or instead of the driver's eye condition. For example, when the driver is concentrating on driving, the steering wheel control by the driver is appropriately performed. On the other hand, when the driver's concentration is decreasing, the steering wheel control becomes inappropriate frequently, and the steering wheel angle is corrected. As a result, the steering wheel repeats fluctuation horizontally (to the right and the left alternately) in a minute angle range (e.g., ±10 degrees) and is steered at a specific frequency (e.g., 0.1 to 0.2 Hz), and a steering wheel angle fluctuates. As a result, a decreased degree of driver's actual concentration can be detected according to how frequently the steering wheel angle fluctuates.

The driver's concentration degree can be detected from the degree of the slack of driver's face muscle. This is because a higher degree of concentration keeps face muscle tenser, while a lower degree of concentration makes face muscle looser and relaxed. The degree of the slack of the driver's face muscle can be determined by reading driver's expression by pattern matching from the video signal produced by photographing the driver's face or from the characteristic positional relation of part of the driver's face. As the positional relation, for example, the distance between the outer edge of the right or left eye of the face and the center line of the face in the vertical direction can be used. When the distance between the outer edge of the right or left eye of the face and the center line of the face in the vertical direction is equal to or greater than the specific value, the actual concentration degree can be considered low. Alternatively, as the positional relation, the distance between the right eyebrow and the right eye or the distance between the left eyebrow and the left eye may be used. Also in this case, when these distances are equal to or greater than the specific value, the actual concentration degree can be considered low.

Furthermore, in the first embodiment, since the auto-cruise control is often performed in a drive way such as an expressway, a required concentration degree is obtained based on preceding vehicle inter-vehicle time obtained by dividing the vehicular distance from the preceding vehicle traveling on the lane of the subject vehicle by the vehicle speed of the subject vehicle, a curve entrance margin time obtained by the distance to a curve entrance point by the vehicle speed, visibility distance time obtained by dividing a visible distance set based on road width by the vehicle speed, and adjacent vehicle inter-vehicle time obtained by dividing the vehicular distance from the adjacent vehicle traveling on the adjacent lane by the vehicle speed of the subject vehicle.

However, the auto-cruise control is not always used only in the drive way, and the adaptive cruise control allows the cruise to follow the preceding vehicle in a relatively low-speed area. Therefore, the required concentration degree may be obtained based on parameters exemplified below, in addition to the above parameters or instead of the parameters.

When pedestrians or bicyclists exist near, care must be taken to secure the safety of such persons. Therefore, when the pedestrians and bicyclists are detected in a specific range (e.g., 30 to 100 m) forward of the vehicle, the required concentration degree may be made higher as the vehicle comes nearer them. Furthermore, the required concentration degree may be calculated according to distance time obtained by dividing a distance from a pedestrian or bicyclist by the vehicle speed of the subject vehicle. A pedestrian or bicyclist can be detected by performing image recognition processing for video signals of a camera that photographs the front of the vehicle, and a distance to the person can be calculated from the video signals.

When a traffic signal exists forward, the driver pays attention to the lamp of the traffic signal, and needs to perform operation for immediately stopping the vehicle when the traffic signal lamp changes to red. Therefore, when the traffic signal is detected in a specific range (e.g., 30 to 100 m) forward of the vehicle, the required concentration degree may be made higher as its distance becomes shorter. Furthermore, the required concentration degree may be determined according to a traffic signal distance time obtained by dividing a distance to the traffic signal by the vehicle speed of the subject vehicle. The traffic signal can be detected by performing image recognition processing for video signals of the camera that photographs the front of the vehicle, and the distance to the traffic signal can be calculated from the video signals.

Furthermore, the required concentration degree required to the driver may be changed depending on the weather during which the vehicle travels. This is because the driver must be more careful in the driving operation of the vehicle because a road surface is slippery or visibility becomes poor during rainfall, snowfall, sunset, or nighttime. Rainfall and snowfall can be detected, for example, from an operating state of a wiper, and when the wiper is operating, a required concentration degree may be increased to a specific value, or may be changed to different levels according to an operation speed of the wiper. Nighttime can be detected from whether the headlight is on. When the headlight is turned on, the required concentration degree may be increased.

What is claimed is:

1. A vehicle control system comprising:
    means for automatically driving a subject vehicle at a fixed speed without a driver's cruise operation for adjusting a cruise speed of the subject vehicle;
    means for detecting a driver's actual concentration degree based on a state of the driver;
    means for acquiring a required concentration degree required to the driver for safely cruising the subject vehicle based on information related to surrounding environments of the subject vehicle; and
    means for changing a control content of the driving means based on a relation between the actual concentration degree detected by the detecting means and the required concentration degree acquired by the acquiring means,
    wherein the required concentration degree acquired by the acquiring means becomes small as the cruise speed of the subject vehicle becomes low, and
    wherein, when the required concentration degree is larger than the actual concentration, the changing means changes the control content of the driving means to decrease a speed, at which the driving means drives the subject vehicle, until the required concentration degree becomes smaller than the actual concentration degree by a specific value.

2. The vehicle control system according to claim 1, wherein:
    the acquiring means acquires the required concentration degree, as the information related to surrounding environment of the subject vehicle, based on at least one of a preceding vehicle inter-vehicle time obtained by dividing a vehicular distance from a preceding vehicle traveling on a same lane as the subject vehicle by the vehicle speed of the subject vehicle, a curve entrance margin time obtained by dividing a distance to a curve entrance point by the vehicle speed, a visibility distance time obtained by dividing a visible distance set based on a road width by the vehicle speed, and an adjacent vehicle inter-vehicle time obtained by dividing a vehicular distance from an adjacent vehicle traveling on an adjacent lane by the vehicle speed of the subject vehicle.

3. The vehicle control system according to claim 1, wherein:
    the detecting means includes means for detecting an opening degree of a driver's eye lid, and detects the actual concentration degree as the state of the driver based on the opening degree of a driver's eyelid.

4. The vehicle control system according to claim 1, wherein:
    the detecting means includes means for detecting an opening degree of a driver's eye lid, and detects the actual concentration degree as the state of the driver based on the opening degree of a driver's eyelid and a time duration of opening when the opening degree detected is smaller than a specific value.

5. The vehicle control system according to claim 1, wherein:
    the detecting means includes means for detecting a driver's eye direction, and detects the actual concentration degree, as the state of the driver, based on the driver's eye direction and time duration of the driver's eye direction when the detected eye direction of the driver is a specific angle or more off a traveling direction of the subject vehicle.

6. The vehicle control system according to claim 5, wherein:
    the actual concentration degree is based on a time ratio that an angle value of the driver's eye direction is a specific angle or more off a traveling direction of the subject vehicle in a specific time interval.

7. The vehicle control system according to claim 1, wherein:
    the detecting means includes means for detecting a steering angle of a steering wheel operated by the driver, and detects the actual concentration degree, as the state of the driver, a degree of fluctuation in angle of the steering wheel operated by the driver.

8. The vehicle control system according to claim 1, wherein:
    the detecting means includes means for photographing a face of the driver, and detects the actual concentration degree, as the state of the driver, based on a slack degree of muscle of a photographed face of the driver.

9. The vehicle control system according to claim 1, wherein:
    the acquiring means acquires the required concentration degree, as the information related to a surrounding environment of the subject vehicle, based on a distance from a person existing ahead of the subject vehicle.

10. The vehicle control system according to claim 1, wherein:
    the acquiring means acquires the required concentration degree, as the information related to a surrounding environment of the subject vehicle, based on a distance from a traffic signal existing forward of the subject vehicle.

11. The vehicle control system according to claim 1, wherein:
the acquiring means acquires the required concentration degree, as the information related to a surrounding environment, based on weather during cruising of the subject vehicle.

12. A vehicle control system comprising:
means for automatically driving a subject vehicle to follow a preceding vehicle with a specific vehicular distance corresponding to the speed of the subject vehicle without a driver's cruise operation for adjusting a cruise speed of the subject vehicle;
means for detecting a driver's actual concentration degree based on a state of the driver;
means for acquiring a required concentration degree required to the driver for safely cruising the subject vehicle based on information related to surrounding environments of the subject vehicle; and
means for changing a control content of the driving means based on a relation between the actual concentration degree detected by the detecting means and the required concentration degree acquired by the acquiring means,
wherein the required concentration degree acquired by the acquisition means becomes smaller as the vehicular distance from the preceding vehicle becomes longer, and
wherein, when the required concentration degree is larger than the actual concentration degree, the driving means changes the control content of the driving means to lengthen a vehicular distance controlled by the driving means until the required concentration degree becomes smaller than the actual concentration degree by a specific value.

13. The vehicle control system according to claim 12, wherein:
the acquiring means acquires the required concentration degree, as the information related to surrounding environment of the subject vehicle, based on at least one of a preceding vehicle inter-vehicle time obtained by dividing the vehicular distance from the preceding vehicle traveling on a same lane as the subject vehicle by the vehicle speed of the subject vehicle, and an adjacent vehicle inter-vehicle time obtained by dividing the vehicular distance from an adjacent vehicle traveling on an adjacent lane by the vehicle speed of the subject vehicle.

14. The vehicle control system according to claim 12, wherein:
the detecting means includes means for detecting an opening degree of a driver's eye lid, and detects the actual concentration degree as the state of the driver based on the opening degree of a driver's eyelid.

15. The vehicle control system according to claim 12, wherein:
the detecting means includes means for detecting an opening degree of a driver's eye lid, and detects the actual concentration degree as the state of the driver based on the opening degree of a driver's eyelid and a time duration of opening when the opening degree detected is smaller than a specific value.

16. The vehicle control system according to claim 12, wherein:
the detecting means includes means for detecting a driver's eye direction, and detects the actual concentration degree, as the state of the driver, based on the driver's eye direction and time duration of the driver's eye direction when the detected eye direction of the driver is a specific angle or more off a traveling direction of the subject vehicle.

17. The vehicle control system according to claim 16, wherein:
actual concentration degree is based on a time ratio that an angle value of the driver's eye direction is a specific angle or more off a traveling direction of the subject vehicle in a specific time interval.

18. The vehicle control system according to claim 12, wherein:
the detecting means includes means for detecting a steering angle of a steering wheel operated by the driver, and detects the actual concentration degree, as the state of the driver, a degree of fluctuation in angle of the steering wheel operated by the driver.

19. The vehicle control system according to claim 12, wherein:
the detecting means includes means for photographing a face of the driver, and detects the actual concentration degree, as the state of the driver, based on a slack degree of muscle of a photographed face of the driver.

20. The vehicle control system according to claim 12, wherein:
the acquiring means acquires the required concentration degree, as the information related to a surrounding environment of the subject vehicle, based on a distance from a person existing ahead of the subject vehicle.

21. The vehicle control system according to claim 12, wherein:
the acquiring means acquires the required concentration degree, as the information related to a surrounding environment of the subject vehicle, based on a distance from a traffic signal existing forward of the subject vehicle.

22. The vehicle control system according to claim 12, wherein:
the acquiring means acquires the required concentration degree, as the information related to a surrounding environment, based on weather during cruising of the subject vehicle.

* * * * *